US009047269B2

(12) United States Patent
Armstrong et al.

(10) Patent No.: US 9,047,269 B2
(45) Date of Patent: Jun. 2, 2015

(54) MODELING INTERACTIONS WITH A COMPUTER SYSTEM

(75) Inventors: Eric P. Armstrong, McKinney, TX (US); Stuart H. Burris, Jr., Garland, TX (US); Christopher Raymond Houck, Dallas, TX (US)

(73) Assignee: Openconnect Systems Incorporated, Dallas, TX (US)

( * ) Notice: Subject to any disclaimer, the term of this patent is extended or adjusted under 35 U.S.C. 154(b) by 912 days.

(21) Appl. No.: 11/553,890

(22) Filed: Oct. 27, 2006

(65) Prior Publication Data

US 2007/0100994 A1    May 3, 2007

Related U.S. Application Data

(60) Provisional application No. 60/731,167, filed on Oct. 28, 2005.

(51) Int. Cl.
*G06F 15/173* (2006.01)
*G06F 11/28* (2006.01)
(Continued)

(52) U.S. Cl.
CPC ............ *G06F 11/28* (2013.01); *H04L 43/045* (2013.01); *H04L 43/04* (2013.01); *G06F 11/32* (2013.01); *G06F 11/3447* (2013.01); *G06F 11/3476* (2013.01); *H04L 12/2602* (2013.01); *H04L 43/00* (2013.01); *H04L 43/06* (2013.01); *H04L 43/106* (2013.01); *H04L 43/16* (2013.01); *G06F 2201/835* (2013.01); *G06F 2201/87* (2013.01)

(58) Field of Classification Search
CPC ............ G06F 11/3447; G06F 11/3476; G06F 2201/87; G06F 11/32; G06F 43/04; G06F 43/045
USPC .................................. 709/223–224
See application file for complete search history.

(56) References Cited

U.S. PATENT DOCUMENTS 5,287,534 A * 2/1994 Reuther et al. ................. 714/819
5,852,449 A * 12/1998 Esslinger et al. .............. 345/473
(Continued)

OTHER PUBLICATIONS

PCT Notification of Transmittal of the International Search Report and the Written Opinion of the International Searching Authority, or the Declaration mailed Jul. 1, 2008 regarding PCT/US 2006/41950 filed Oct. 27, 2006 (7 pages), Jul. 1, 2008.
(Continued)

*Primary Examiner* — Patrice Winder
*Assistant Examiner* — Angela Widhalm
(74) *Attorney, Agent, or Firm* — Baker Botts L.L.P.

(57) ABSTRACT

In certain embodiments, a method for modeling interactions with a computer system includes collecting interaction information for each of a number of interaction sessions with a computer system, each interaction session being associated with a corresponding agent system and including one or more states and one or more state transitions. The interaction information for an interaction session includes data for the one or more states and the one or more state transitions of the interaction session. The method further includes, for each of the interaction sessions, identifying the one or more states encountered during the interaction session based on the collected interaction information and generating, based on the one or more states encountered during the interaction session, a trace of the interaction session. The method further includes generating, based on the traces of the interaction sessions, a model of the interaction sessions, the model including the traces for each of the interaction sessions.

23 Claims, 10 Drawing Sheets

(51) Int. Cl.
*G06F 11/34* (2006.01)
*H04L 12/26* (2006.01)
*G06F 11/32* (2006.01)

(56) References Cited

U.S. PATENT DOCUMENTS

| | | | | |
|---|---|---|---|---|
| 5,870,737 | A | | 2/1999 | Dockter et al. .................... 707/4 |
| 5,960,199 | A | * | 9/1999 | Brodsky et al. ............... 717/128 |
| 5,974,412 | A | | 10/1999 | Hazlehurst et al. ................ 707/3 |
| 6,021,403 | A | | 2/2000 | Horvitz et al. .................. 706/45 |
| 6,056,835 | A | * | 5/2000 | Miyake et al. ................ 148/415 |
| 6,059,835 | A | | 5/2000 | Bose ............................... 703/19 |
| 6,233,570 | B1 | | 5/2001 | Horvitz et al. .................. 706/11 |
| 6,381,654 | B1 | * | 4/2002 | Brawn et al. .................. 719/331 |
| 6,662,226 | B1 | * | 12/2003 | Wang et al. .................... 709/224 |
| 6,763,354 | B2 | | 7/2004 | Hosken ............................. 707/6 |
| 6,778,192 | B2 | | 8/2004 | Arbab et al. .................... 345/786 |
| 6,836,780 | B1 | | 12/2004 | Opitz et al. ................ 707/104.1 |
| 6,904,590 | B2 | * | 6/2005 | Ball et al. ....................... 717/132 |
| 7,099,798 | B2 | * | 8/2006 | Yu et al. ......................... 702/186 |
| 7,162,530 | B2 | * | 1/2007 | Selitrennikoff et al. ...... 709/230 |
| 7,376,937 | B1 | * | 5/2008 | Srivastava et al. ............ 717/128 |
| 7,506,047 | B2 | * | 3/2009 | Wiles, Jr. ....................... 709/224 |
| 7,714,878 | B2 | * | 5/2010 | Gabay et al. .................. 345/626 |
| 8,127,000 | B2 | * | 2/2012 | Wenig et al. .................. 709/224 |
| 8,782,541 | B2 | * | 7/2014 | Hayner et al. ................. 715/764 |
| 2001/0044757 | A1 | | 11/2001 | Robb et al. ........................ 705/27 |
| 2002/0178401 | A1 | | 11/2002 | Ball et al. ......................... 714/38 |
| 2004/0054682 | A1 | | 3/2004 | Kano ............................. 707/100 |
| 2004/0075692 | A1 | | 4/2004 | Matichuk ...................... 345/806 |
| 2005/0010445 | A1 | | 1/2005 | Krishnan et al. .................. 705/2 |
| 2005/0071464 | A1 | * | 3/2005 | Kuwata et al. ................ 709/224 |
| 2005/0183075 | A1 | * | 8/2005 | Alexander et al. ............ 717/144 |

OTHER PUBLICATIONS

European Patent Office Search Report and Supplementary European Search Report (Art. 153(7) EPC) and European Search Opinion, regarding Appl. /Patent No. 06849855.9-2224 / 1952261, PCT/US 2006/41950 filed Oct. 27, 2006 (9 pages), Dec. 16, 2009.

M. El-Ramly, E. Stroulia, P. Sorenson: "Recovering Software Requirements from System-user Interaction Traces", Dept. of Computing Science, Univ. of Alberta, SEKE '02, Proceedings of the 14th Int'l Conference on Software Engineering and Knowledge Engineering; ACM, [online] (Jul. 2002), pp. 447-454, XP-002558472; ISBN: 1-58113-556-4, URL: http://doi.acm.org/10.1145/568760.568837 from Nov. 30, 2009, Jul. 2002.

M. El-Ramly, et al., "Modeling the System-User Dialog Using Interaction Traces", Dept. of Computing Science, Univ. of Alberta, Reverse Engineering, Proceedings of the 8th Working Conference, (Oct. 2, 2001), pp. 208-217, XP-010563205; ISBN: 978-0-7695-1303-4.

E. Stroulia et al., "Reverse Engineering Legacy interfaces: An Interaction-Driven Approach", Dept. of Computing Science, Univ. of Alberta, Reverse Engineering, 1999 IEEE, Proceedings of the 6th Working Conference on Atlanta, GA, USA Oct. 6-8 (Oct. 6, 1999), pp. 292-302, XP-010360147; ISBN: 978-0-7695-0303-5.

K. Chan et al., "Design Recovery of Interactive Graphical Applications", School of Computer Science and Engineering, Univ. of New South Wales, Proceedings of the 25th Int'l Conference on Software Engineering, ICSE 2003, IEEE Comp. Soc., pp. 114-124, XP-010640111; ISBN: 978-0-7695-1877-0, May 3, 2003.

*Israel Patent Office Communication* Re: Hebrew version and brief English Translation of Office Action, Israeli Patent Appl. No. 178922, Ref: 21494/mis/06, (5 pgs), Jan. 29, 2012.

*Israel Patent Office Communication* Re: Hebrew version and brief English Translation of Office Action, Israeli Patent Appl. No. 178922, Ref: 2149/mis/06 (5 pgs), Mailed Mar. 1, 2011.

Canadian Intellectual Property Office, Communication regarding Application No. 2,625,247 dated Oct. 23, 2013.

Communication from Canadian Intellectual Property Office dated Sep. 17, 2014 regarding Application No. 2,625,247.

El-Ramly et al., "Mining System-User Interaction Traces for Use Case Models," 10th Intl. Workshop on Program Comprehension, Copyright 2002 IEEE, Computer Society.

European Patent Office, Communication regarding Application No. 06 849 855.9-1954, Jun. 27, 2014.

\* cited by examiner

FIG. 12A
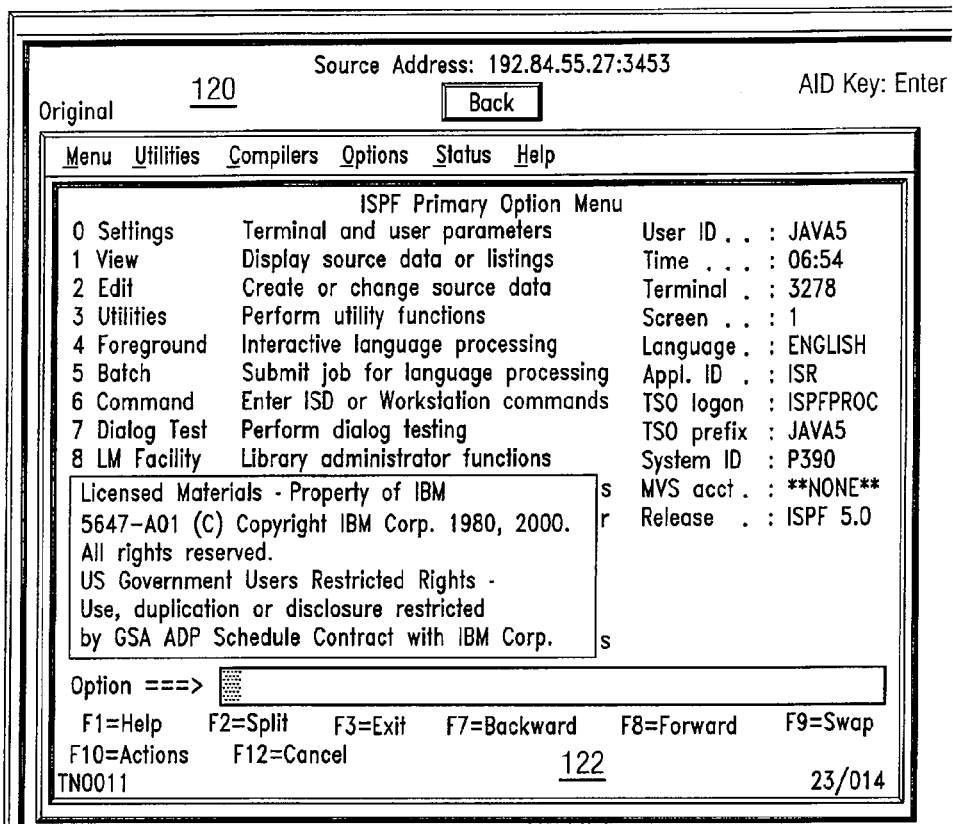
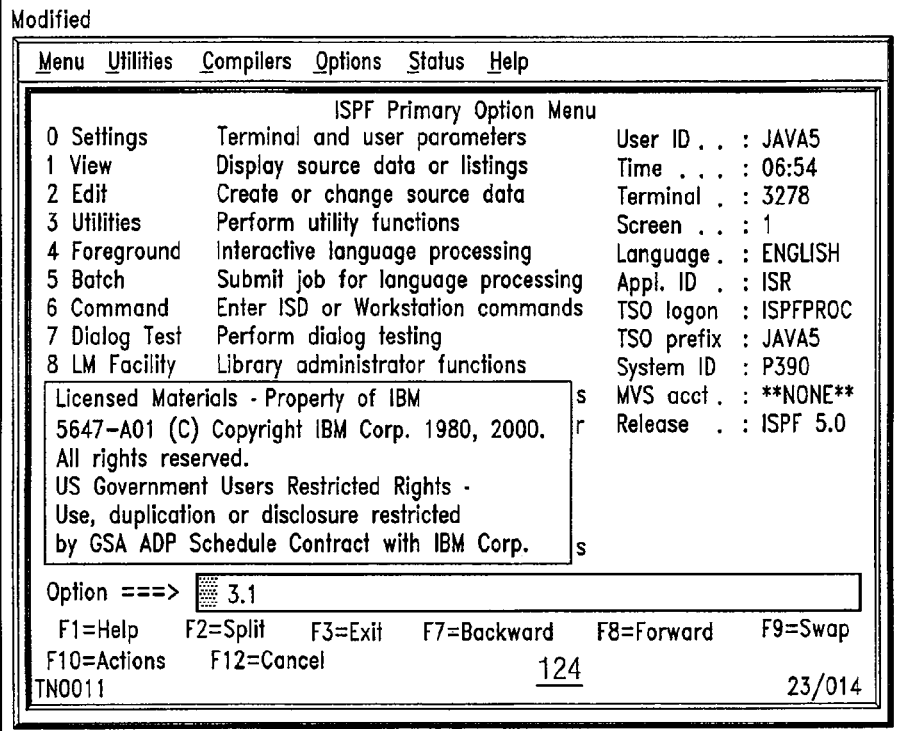

MODELING INTERACTIONS WITH A COMPUTER SYSTEM

RELATED APPLICATION

This application claims priority under 35 U.S.C. §119(e) of provisional application Ser. No. 60/731,167 filed Oct. 28, 2005.

TECHNICAL FIELD OF THE INVENTION

This invention relates generally to computer systems and more particularly to modeling interactions with a computer system.

BACKGROUND

Many organizations operate computer network environments that include legacy host systems or other computer systems which store data and provide applications that support the operation of the organization. Legacy host systems may include, for example, IBM mainframes (e.g., the Multiple Virtual Storage (MVS) system manufactured by IBM, the Virtual Storage Extended (VSE) system manufactured by IBM, and Virtual Machine (VM) environments), IBM AS/400 systems, and UNIX host systems.

Legacy applications, which may include computer applications running on a legacy host system, typically operate using standard terminal screen interfaces, such as the TN3270 screen protocol or another suitable screen protocol. While these legacy host systems continue to serve useful purposes or remain in operation for other reasons, it may be desirable for these legacy systems to be accessible over different types of network connections, such as those available over the Internet, which may expose the functionality of these systems to Internet users.

It may be desirable for these organizations to provide connection to the legacy host systems through terminal sessions on distributed agent systems, such as personal computers and computer workstations. This connection to the legacy host system provides access for users of the agent systems to the data and applications on the legacy host system. These terminal sessions can include TN3270, TN5250, NVT and VT220 type terminal sessions.

SUMMARY

According to the present invention, disadvantages and problems associated with previous techniques for modeling interactions with a computer system may be reduced or eliminated.

In certain embodiments, a method for modeling interactions with a computer system includes collecting interaction information for each of a number of interaction sessions with a computer system, each interaction session being associated with a corresponding agent system and including one or more states and one or more state transitions. The interaction information for an interaction session includes data for the one or more states and the one or more state transitions of the interaction session. The method further includes, for each of the interaction sessions, identifying the one or more states encountered during the interaction session based on the collected interaction information and generating, based on the one or more states encountered during the interaction session, a trace of the interaction session. The method further includes generating, based on the traces of the interaction sessions, a model of the interaction sessions, the model including the traces for each of the interaction sessions.

Particular embodiments of the present invention may provide one or more technical advantages. In certain embodiments, the present invention provides a mechanism to observe and store a plurality of, and potentially all, interactions between one or more agent systems and one or more computer systems, such as one or more legacy host systems. The collected interaction information may be used to generate a model of the use and capabilities of the computer system. In certain embodiments, the model includes a finite state machine model of the underlying computer system, generated through collection and analysis of interaction information of interaction sessions with the computer system (e.g., interaction sessions with one or more applications of the computer system), which may be augmented with actual use statistics (e.g., based on the interaction sessions of one or more agent systems with the computer system). Among other advantages, this model of the computer system may simplify encapsulation of business processes, threat and intrusion detection, and provision of an audit trail of computer system interaction.

In general, the present invention relates to building a knowledge base by collecting interaction information associated with agent interaction sessions with one or more applications of a computer system, such as one or more mainframe applications of a legacy host system. The collected interaction information may include selections made by the agent, data entered by the agent, display information, application flow information, or other suitable information. For example, certain embodiments of the present invention provide the ability to monitor what screens, what input data, and what action keys an agent is submitting to the computer system and what screens and what output data the computer system is generating in response. This may provide the ability to create a map through applications of the computer system to perform certain transactions. The collected interaction information for each agent may be analyzed to generate a trace of the agent's interaction with the computer system. Combining the traces of a number of agents may facilitate building the model of the computer system, which, among other possible benefits, may allow developer to see how the computer system is being used by web users.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which:

FIGS. 12A-12B illustrate an example Session Flow Detail display according to certain embodiments of the present invention.

DESCRIPTION OF EXAMPLE EMBODIMENTS

Figure 1:
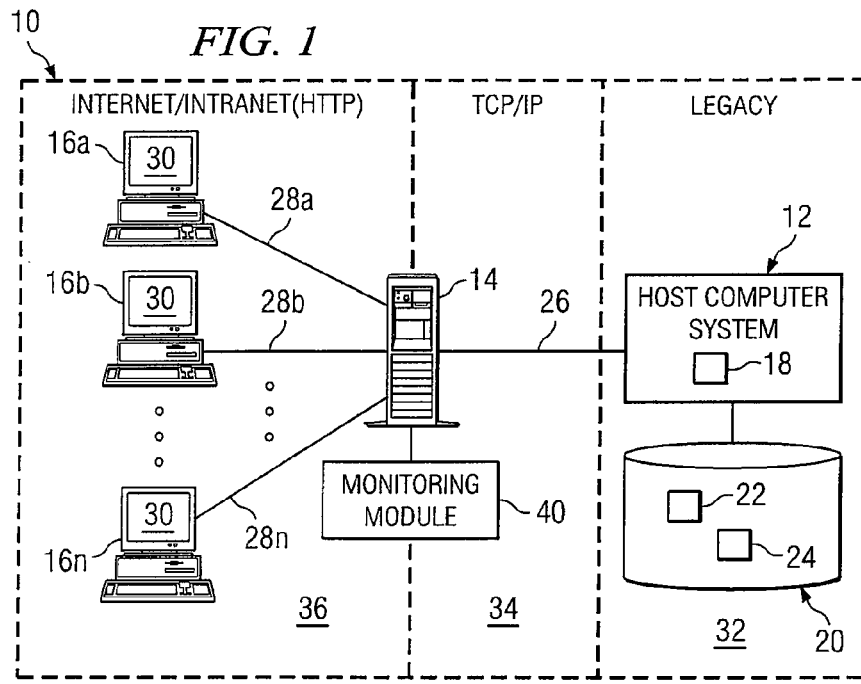
FIG. 1 illustrates an example system for modeling interactions with a computer system, according to certain embodiments of the present invention.

FIG. 1 illustrates an example system 10 for modeling interactions with a computer system 12, according to certain embodiments of the present invention. System 10 may include one or more computer systems 12, a server system 14, and one or more agent systems 16. Although an example implementation of system 10 is illustrated and primarily described, the present invention contemplates any suitable implementation of system 10.

In certain embodiments, the present invention provides a mechanism for analyzing and storing a plurality of, and potentially all, interactions between agent systems 16 and computing systems 12. This collected information may be analyzed and used to create a model of use of computer system 12 and the capabilities of computer system 12. In certain embodiments, through analysis of interaction information regarding interaction sessions of agent systems 16 with computer system 12, a finite state machine model of computer system 12 may be generated. This finite state machine model, or another type of generated model, may be augmented with actual use statistics reflecting use of computer system 12 by agent systems 16.

In certain embodiments, computer system 12 includes a legacy host computer system, such as a mainframe computer system. For example, computer system 12 may include one or more IBM mainframes (MVS, VM, and VSE environments), IBM AS/400 systems, UNIX host systems, or another type of server system. Computer system 12 may include one or more suitable input devices, output devices, mass storage media, processing units, memory units, or other components for receiving, processing, storing, and communicating information according to the operation of system 10. For example, computer system 12 may include one or more computers at one or more locations. Throughout the remainder of this description, computer system 12 will be referred to as legacy host system 12; however, the present invention contemplates computer system 12 being any suitable type of computer system, according to particular needs. Moreover, throughout the remainder of this description, computer system 12 will be referred to primarily in the singular; however, the present invention contemplates system 10 including any suitable number of computer systems 12.

Legacy host system 12 may include one or more applications 18. Typically, applications 18 associated with legacy host system 12 are legacy applications. For example, these legacy applications may include business logic for performing various transactions by interacting with users of application 18 (e.g., users of agent systems 16, as will be described more fully below). The present invention contemplates applications 18 performing any suitable functions and serving any suitable purpose according to particular needs. As just one non-limiting example, application 18 may be a banking application that provides one or more banking functions, such as retrieving account information, modifying account information, or other suitable banking functions.

Applications 18 may include any suitable combination of hardware, software, and firmware, according to particular needs. Applications 18 may be written in any suitable programming language. In certain embodiments, applications 18 may include computer software written in COBOL or another suitable programming language used for legacy applications. Throughout the remainder of this description, applications 18 will be referred to primarily in the singular; however, the present invention contemplates legacy host system 12 including any suitable number of applications 18.

Legacy host system 12 may be associated with a memory module 20, which may store any suitable data for use by legacy host system 12. For example, memory module 20 may store one or more templates 22 for use by applications 18 of legacy host system 12 in generating terminal screens for transmission to agent systems 16. As another example, memory module 20 may store data 24 used by legacy host system 12 for interacting with server system 14 and/or agent systems 16. Templates 22 and data 24 may be organized in any suitable manner, such as in one or more database tables.

Memory module 20 may include any suitable memory or database module and may take the form of volatile or non-volatile memory including, without limitation, magnetic media, optical media, random access memory (RAM), read-only memory (ROM), removable media, or any other suitable local or memory component. In certain embodiments, memory module 20 includes one or more SQL servers. Additionally, memory module 20 may be integral to or separate from legacy host system 12.

System 10 may include server system 14, which may be coupled to legacy host system 12 and agent systems 16. For example, server system 14 may be coupled to legacy host system 12 via a link 26 and may be coupled to agent systems 16 via links 28a-28n. Links 26 and 28 may each include one or more local area networks (LANs), metropolitan area networks (MANs), wide area networks (WANs), radio access networks (RANs), a global computer network such as the Internet, or any other wireline, optical, wireless, or other links. Links 26 and 28 may communicate, for example, Internet Protocol (IP) packets, Frame Relay frames, or Asynchronous Transfer Mode (ATM) cells to communicate voice, video, data, and other suitable information between network addresses. Link 26 may include any suitable type of connection for communicating with legacy host system 12, such as a transmission control protocol (TCP)/Internet Protocol (IP) connection. Additionally, links 28 may include any suitable type of connection for communicating with agent systems 16, such as for communicating Hypertext Transfer Protocol (HTTP) over the Internet/Intranet. Those of skill in the art will appreciate that, in certain embodiments, any number of intervening servers may exist between server system 14 and legacy host system 12, as well as between server system 14 and agent systems 16.

In general, server system 14 provides an interface between legacy host system 12 and agent systems 16. For example, server system 14 may facilitate communication between agent systems 16 and legacy host system 12, providing agent systems 16 with access to legacy host system 12 and/or applications 18 of legacy host system 12. In certain embodiments, server system 14 includes a web server and/or an emulation server; however, the present invention is not limited to server system 14 being a web server and/or an emulation server. As just two examples, server system 14 may include a WEBCONNECT server or a SLICONNECT server, both manufactured by OPENCONNECT SYSTEMS, INC.

System 10 may include one or more agent systems 16. An "agent" may include any entity or process that interacts with legacy host system 12 and/or application 18 through a predefined input and/or output interface. For example, agents may include users of agent systems 16 or applications of agent systems 16. Agent system 16 and agent or user of agent system 16 may be referred to interchangeably throughout this description.

Agent systems 16 may each include one or more computers at one or more locations and may share data storage, communications, or other resources according to particular needs. For example, functionality described in connection with agent system 16 may be provided using a single computer system, which in a particular embodiment might include a conventional desktop or laptop computer. Furthermore, functionality described in connection with agent systems 16 may be provided using any suitable software components. Each computer system may include one or more suitable input devices, output devices, mass storage media, processing units, memory units, or other components for receiving, processing, storing, and communicating information according to the operation of system 10. Although a particular number of agent systems 16 are illustrated, the present invention may include any suitable number of agent systems 16. Each agent system 16 may operate using a different user platform, or two or more agent systems 16 may operate using identical user platforms.

In certain embodiments, agent systems 16 may each include an interface 30 for facilitating transmission and receipt of data over link 28. For example, interface 30 may include a generic web browser, such as MICROSOFT INTERNET EXPLORER, NETSCAPE NAVIGATOR, or any other suitable browser. In certain embodiments, interface 30 need not be an Internet browser but may include any suitable network browser or other interface. Each agent system 16 may interact with application 18 of legacy host system 12 (through server system 14) using its corresponding interface 30.

Agent systems 16 engage in interaction sessions with legacy host system 12 (e.g., with one or more applications 18 of legacy host system 12) via server system 14. An interaction session may include any interaction between an agent system 16 and legacy host system 12. An interaction session may include one or more states and one or more state transitions. Example states and state transitions are described in more detail below with reference to FIGS. 2-4. In general, however, a state may include a condition of a computing system (or an application of a computing system). The computing system may transition from state to state according to input data received by the computing system and output data generated by the computing system.

In certain embodiments, an interaction session may include communication of one or more input screens by agent system 16, communication of one or more output screens by legacy host system 12, one or more action keys engaged by agent system 16, communication of data input in an input screen by an agent system 16, communication of data output in an output screen by legacy host system 12, or any other suitable interaction between legacy host system 12 and agent system 16. The states encountered during an interaction session may be defined as the one or more screens encountered during the interaction session, along with any other suitable information. For greater specificity, the states encountered during an in interaction session may be defined as the one or more screens encountered during the interaction session, including any data input or output into the screen. A transition from a state may be caused by an action key engaged from a screen. For example, an action key could include an "Enter" key, a "Submit" key, a "Confirm" key, or any other suitable type of action key.

In certain embodiments, legacy host system 12 is part of a legacy environment 32, server system 14 interacts with legacy host system 12 in a TCP/IP environment 34 (e.g., using one or more TCP/IP links 26), and agent computer systems 16 interact with server system 14 in an Internet/Intranet environment 36 (e.g., using a standard user interface language such as Hypertext Markup Language (HTML) and a standard protocol such as Hypertext Transfer Protocol (HTTP)). For example, server system 14 may accept input from agent systems 16 via a web browser and return appropriate HTML pages. Server system 14 may provide an interface between TCP/IP environment 34 and Internet/Intranet environment 36. In certain embodiments, agent interaction includes a user or system interacting with the mainframe application through, for example, a TN3270 data terminal interface. Thus, in certain embodiments, server system 14 provides a terminal emulation function in order to provide an interface to applications 18 over a network such as the Internet or an Intranet. It should be understood that these environments are provided merely as examples; the present invention contemplates system 10 including any suitable numbers and types of environments, and the components of system 10 being coupled using any suitable types of connections, according to particular needs.

During an interaction session, application 18 of legacy host system 12 communicates screens to server system 14 in a particular format, which is typically an archaic format that may not be directly displayable in interface 30. The particular format for communication between legacy host system 12 and server system 14 may depend on the type of legacy host system 12 used in system 10. As examples, data exchanged between legacy host system 12 and server system 14 may be TN3270 data, TN5250 data, enterprise extender data, or data in another suitable format. Throughout the remainder of this description, the data format communicated between legacy host system 12 and server system 14 will be referred to as a terminal format. The screens communicated by legacy host system 12 may also include output data generated by legacy host system 12. For example, the output data may include data in one or more fields of a screen transmitted by legacy host system 12 to agent system 16.

Server system 14 may receive the screens and the output data communicated by legacy host system 12 and may perform certain data transformations on those screens. For example, server system 14 may transform the screens into a different format that is displayable in interface 30 of agent systems 16 (e.g., HTML, XML, or another suitable format). Server system 14 may also receive screens and input data from agent systems 16 and may perform certain data transformations on those screens such that legacy host system 12 can process the screens and the input data.

In operation of an example interaction session in an example embodiment of system 10, agent system 16 may use interface 30 to initiate an interaction session by logging onto legacy host system 12 via server system 14. Assume, for purposes of this example, that application 18 is the banking application described above. In response to a successful login, legacy host system 12 may communicate a screen to server system 14. This screen may be a default screen displayable after a successful login, specified in the login request by agent system 16, or any other suitable screen, according to particular needs. For example, the screen may be a summary screen for the bank account of agent system 16. Server system 14 may receive the screen and any output data in the terminal format. Server system 14 may convert the terminal data into a format communicable via links 30 and displayable by interface 30 of agent system 16. For example, the summary screen may be displayed by interface 30 on agent system 16 as a web page. Agent system 16 may input data into the screen. For example, agent system 16 may input data to request an account balance. Agent system 16 may submit this input data, along with the current screen, to server system 14.

Server system 14 may process the screen and input data submitted by agent system 16 and convert that data into a format that may be processed by application 18 of legacy host system 12. Legacy host system 12 may process the screen and the input data. In this example, legacy host system 12 may attempt to fulfill the account balance request submitted by agent system 16. This processing may include, for example, determining the appropriate account number from the input data, accessing data 24 in memory module 20 to retrieve the account balance, and generating a screen with the output data of the determined account balance (and any other suitable output data) for communication to server system 14 (and ultimately to agent system 16). Server system 14 may transform the output screen and output data received from legacy host system 12 into a format displayable by interface 30 of agent system 16. This process may iterate as many times as is appropriate. Thus, server system 14 may be viewed as a translator between environments (e.g., between TCP/IP environment 36 and Internet/Intranet environment 38).

System 10 includes a monitoring module 40 operable to monitor interaction sessions between agent systems 16 and legacy host system 12. For example, monitoring module 40 is operable to collect interaction information regarding interaction sessions between agents systems 16 and legacy host system 12.

During an interaction session, the flow of data from agent system 16 to server system 14 (e.g., destined for legacy host system 12) and the flow of data from legacy host system 12 to server system 14 (e.g., destined for an agent system 16) each may be viewed as a stream of data. For example, the flow of data from agent system 16 to server system 14 (e.g., destined for legacy host system 12) may be viewed as a stream of data in a format suitable for communication over an Internet/Intranet connection, and the flow of data from legacy host system 12 to server system 14 (e.g., destined for an agent system 16) may be viewed as a stream of data in a terminal format. Monitoring module 40 may collect interaction information regarding interaction sessions by accessing and storing a portion or all of these raw data streams. Monitoring module 40 may store collected interaction information in any suitable storage medium at any suitable location.

Interaction information collected by monitoring module 40 may include selections made by an agent system 16, data entered into a screen by an agent system 16, data gathered by parsing the screens passed between agent system 16 and legacy host system 12, display information, application 18 flow information, action keys, or any other suitable information.

Monitoring module 40 is operable to analyze collected interaction information regarding interaction sessions. In general, computing systems (e.g., legacy host system 12) or their applications (e.g., applications 18) may be viewed generically as a set of inputs, outputs, and the transitions between states of the system. Agent systems 16 may interact with the legacy host system 12 by, for example, creating an interaction session, providing input to the legacy host system 12, receiving output from legacy host system 12, and continuing to iterate by providing input to and receiving output from legacy host system 12 until the interaction session is terminated. Legacy host system 12 may transition from state to state through either output being generated by legacy host system 12 or input coming from agent system 16.

Figure 2:
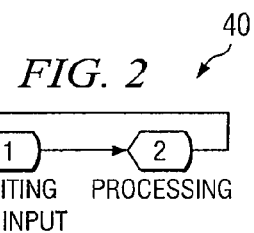
FIG. 2 illustrates an example state description of a simple example application.

FIG. 2 illustrates an example state description 40 of a simple example application 18. As a particular non-limiting example, application 18 may be a simple application that responds with the current time at a particular airport. Assume that application 18 is currently in a "Waiting for Input" state 1. An example transition may include an agent system 16 providing input in the form of an airport code (e.g. "DFW" for Dallas/Fort-Worth International Airport). Application 18 may, in response to this input, change states to a "Processing" state 2. Subsequently, application 18 may return an output of the current time at Dallas/Fort Worth International Airport and then return to the "Waiting for Input" state 1. In the example illustrated and described with reference to FIG. 2, the states of application 18 could be identified simply by whether or not agent system 16 provided an input string to application 18 for the state (i.e., in which case application 18 would be in "Processing" state 2) or if the state (i.e., "Waiting for Input" state 1) was reached by an output from application 18.

In analyzing collected interaction information for an interaction session, analysis module 40 may determine one or more states for the interaction session. In this example, each individual agent system 16's transitions through legacy host system 12 are recorded, and a state recognition procedure is applied to determine each of the individual traces for each of the interaction sessions. Example traces are described below.

Figure 3:
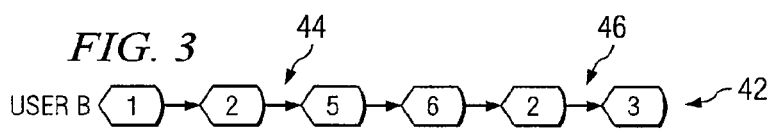
FIG. 3 illustrates an example trace of an interaction session of a single agent system with a legacy host system.

FIG. 3 illustrates an example trace 42 of an interaction session of a single agent system 16 with legacy host system 12. A trace of an interaction session may include the sequence of transitions through states of the interaction session. In this example, trace 42 represents the interaction of User B with application 18 of legacy host system 12 as a sequence of inputs and outputs to and from the legacy host system 12, from the initiation of the interaction session (e.g., state 1 in this case) through the termination of the interaction session (e.g., state 3 in this case). Thus, in this example, trace 42 of the interaction session of User B includes the following states in sequence: state 1; state 2; state 5; state 6; state 2; and state 3.

An analysis by analysis module 40 of this single-agent trace 42 may determine, in part, that under certain circumstances, state 2 may lead to state 5 (as shown at arrow 44). Those circumstances may include a particular action key being activated, a particular set of input data being provided at state 2, a particular set of output data being generated at state 2, or other suitable circumstances. Analysis module 40, in analyzing single-agent trace 42, may also determine that, under other circumstances, state 2 may lead to state 3 (as shown at arrow 46). Again, those circumstances may include a particular action key being activated, a particular set of input data being provided at state 2, a particular set of output data being generated at state 2, or other suitable circumstances.

Figure 4:
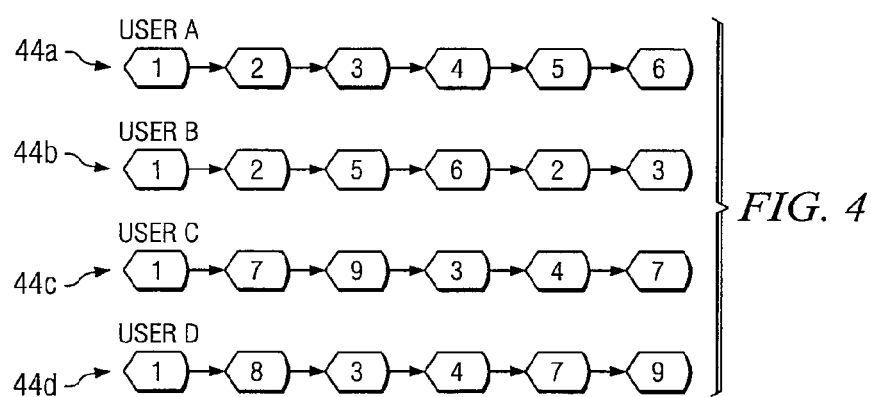
FIG. 4 illustrates multiple example traces, each associated with a corresponding interaction session between an agent system and a legacy host system.

FIG. 4 illustrates multiple example traces 44, each associated with a corresponding interaction session between an agent system 16 and legacy host system 12. In this example, each user is associated with its own interaction session with legacy host system 12, and each interaction session is associated with a corresponding trace 44. The trace 44 corresponding to a user represents the interaction session of that user (e.g., agent system 16) with legacy host system 12. For example, trace 44a corresponds to the interaction session for User A, trace 44b corresponds to the interaction session for User B, trace 44c corresponds to the interaction session for User C, and trace 44d corresponds to the interaction session for User D. Interaction information for each individual user's interaction session with legacy host system 12 may be collected and stored (e.g., by monitoring module 40). Analysis module 40 may apply a state recognition procedure to determine each of the individual traces 44, each trace 44 including the one or more determined states of its associated interaction session.

Returning to FIG. 1, monitoring module 40 may be operable to analyze collected interaction information for a number of interaction sessions to generate a model of application 18. For example, monitoring module 40 may analyze collected interaction information for a number of interaction sessions to generate a combined trace graph 46 or other suitable finite state machine for application 18. For each interaction session for which interaction information is collected, monitoring module 40 may determine a trace for the interaction session. As described above, to accomplish determining a trace, monitoring module 40 may apply a state recognition procedure to the collected interaction information for an interaction session.

While any one trace (e.g., any one trace 44 in FIG. 4) may provide possible state transitions that the underlying application 18 may encounter, a single trace (e.g., trace 44a) may only represent one possible sequence of state transitions from a number of possible unique state transitions. In certain embodiments, to determine what underlying state transitions are possible, the present invention may analyze traces 44 for multiple interaction sessions and/or multiple agent systems 16 and combine those individual traces 44 into an overall state machine description of the application 18 with which those agent systems 16 are interacting.

Figure 5:
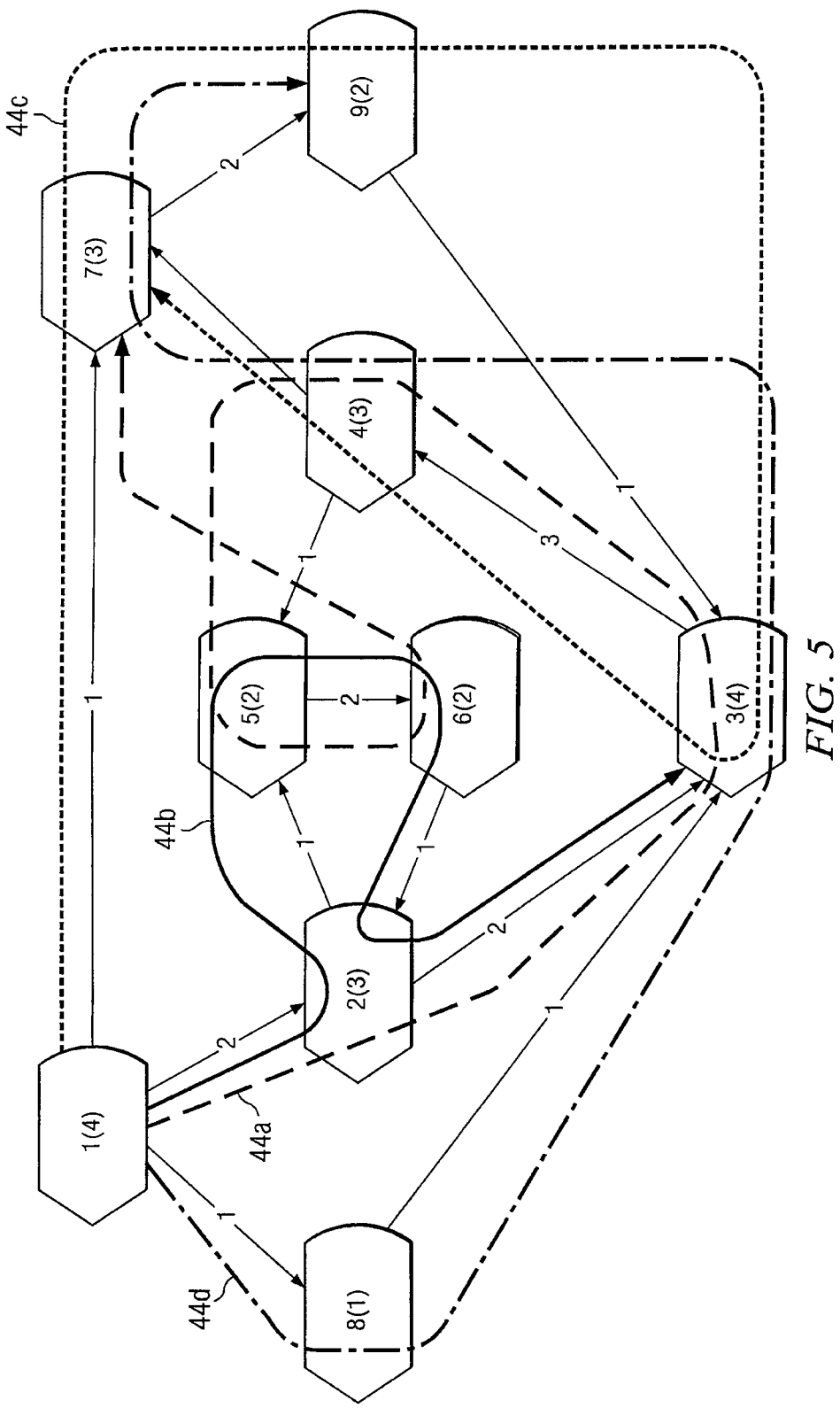
FIG. 5 illustrates an example combined trace graph for multiple interaction sessions of one or more agent systems, according to certain embodiments of the present invention.

FIG. 5 illustrates an example combined trace graph 46 for multiple interaction sessions of one or more agent systems 16, according to certain embodiments of the present invention. The interaction sessions represented in combined trace graph 46 may be associated with a single agent system 16 or multiple agent systems 16. Combining traces of multiple interaction sessions together may provide a technique for reverse engineering the underlying finite state machinery of the application 18 of legacy host system 12 with which agent systems 16 are interacting. In certain embodiments, by combining traces together, the present invention creates a finite state machine that represents the application 18 being modeled by system 10. For example, while in any one of traces 42 and 44 described above with reference to FIGS. 3-4, it was observed that application 18 exited state 1 only once (i.e., a transition to state 2 in both cases), in combined trace graph 46 it is apparent that the application 18 is able to transition to from state 1 to any of states 2, 7, or 8, depending on the circumstances.

The example combined trace graph 46 illustrated in FIG. 5 includes use counting information, which may provide certain statistical information related to the application 18 being modeled using system 10. For example, in addition to or as an alternative to reverse engineering the finite state machine that represents the underlying application 18, combining multiple traces may allow the state machine to be augmented with real use information. This may allow statistical information on how often certain states and certain paths are used by agent systems 16 to be provided.

Combined trace graph 46 in FIG. 5 is determined from the multiple independent traces shown in FIG. 4, and includes each of the states encountered in traces 44 of FIG. 4. Each state is represented by a shape that includes a number adjacent to a number in parenthesis (e.g., 1(4)). In this format, the number indicates the state number and the number in parenthesis indicates the number of times that state was encountered (e.g., state 1 was encountered four times by users A-D). The path of each trace 44 is shown in combined trace graph 46 (i.e., as indicated by reference numerals 44a-44d). Additionally, states are connected by an arrow indicating whether a transition between those states occurred and the direction of that transition. The arrow that connects two states also includes a number, which indicates the number of times that particular transition occurred. For example, the transition from state 1 to state 2 occurred twice, once for user A and once for user B.

In operation of an example embodiment of system 10, monitoring module 40 may collect interaction information for one or more interaction sessions. One or more agent systems 16 may each engage in one or more interaction sessions with legacy host system 12 (via server system 14), substantially simultaneously, at different times, or both. Each interaction session may be associated with a data stream that includes interaction information for the interaction session. In certain embodiments, the interaction information includes data for one or more screens, input data, output data, action identifiers (AIDs) for action keys engaged by agent system 16, or any other suitable data according to particular needs. In certain embodiments, the data stream for an interaction session is formatted as a terminal emulation protocol, such as TN3270, TN5250, NVT, VT220, or any other suitable terminal emulation protocol.

Monitoring module 40 may collect interaction information for one or more of the interaction sessions by accessing the data stream for the interaction session and storing all or a portion of the data stream in a suitable storage medium. In certain embodiments, monitoring module 40 may be configured to filter what interaction information to collect. For example, monitoring module 40 may be configured to collect interaction information for interaction sessions associated with agent systems 16 that are in a particular network domain. Any other suitable filters are contemplated by the present invention.

Monitoring module 40 may determine whether it is time to analyze at least a portion of the collected interaction information. In certain embodiments, monitoring module 40 analyzes interaction information on a scheduled basis. For example, monitoring module 40 may analyze a batch of collected interacted information at a scheduled time (e.g., once a week). In other embodiments, monitoring module 40 may analyze collected interaction information in substantially real time, as monitoring module 40 is collecting interaction information for example. In certain embodiments, monitoring module 40 may be configured to analyze only a portion of collected interaction information. The portion may include, for example, interaction information collected for interaction sessions associated with agent systems 16 in a particular network domain. The collected and stored interaction information may be indexed, using one or more identifiers for example, in a manner that the interaction session associated with a particular set of interaction information can be determined.

If monitoring module 40 determines that it is not time to analyze at least a portion of the collected interaction information, then monitoring module 40 may continue to collect interaction information for one or more interaction sessions. If, however, monitoring module 40 determines that it is time to analyze at least a portion of the collected interaction information, then monitoring module 40 may begin analyzing the collected interaction information. It should be noted that even while monitoring module 40 is analyzing collected interaction information, monitoring module 40 may continue to collect interaction information.

For each interaction session in the collected interaction information being analyzed, monitoring module 40 may identify one or more states encountered during the interaction session based on the collected interaction information and generate, based on the one or more states encountered during the interaction session, a trace of the interaction session. In certain embodiments, monitoring module 40 may identify the one or more states encountered during the interaction session by performing a state recognition procedure on the interaction information for the interaction session being analyzed. Performing the state recognition procedure may include parsing the interaction information for the interaction session and determining one or more states encountered during the interaction session.

In certain embodiments, each interaction session may include one or more screens encountered during the interaction session and one or more actions initiated during the interaction session, each state of the interaction session comprising a screen encountered during the interaction session. In such embodiments, the collected interaction information for a session may include screen interaction information, the screen interaction information being associated with the one or more screens encountered during the interaction session.

The screen interaction information may include data for one or more of the following: (1) one or more screens encountered during the interaction session; (2) data input into a screen using an agent computer system; (3) data output into a screen from the computer system; (4) one or more AIDs for action keys engaged during the interaction session; and (5) any other suitable data.

As monitoring module 40 parses the interaction information for a particular interaction session, monitoring module may identify, in part, screens encountered during the interaction session. State identification may be determined using field mark positions within the 3270 data stream, as well as the attributes of the field within the 3270 data stream. For example, when a screen is processed by monitoring module 40, one or more rules may be generated. These rules may specify the fields that exist in the screen, the names of the fields, and how those fields are formatted. These rules may define a data structure or object for that screen. An example panel object for storing an instance of a screen is described below with reference to FIG. 8.

Each screen may labeled with a hash-code representation or other suitable representation of the field mark positions. Each screen, which may include associated input data or output data and one or more AIDs for action keys engaged, may represent a state of application 18. As monitoring module 40 encounters screens during its analysis of interaction information, monitoring module 40 may store an instance of the screen. The stored instance of the screen may include any suitable information, according to particular needs. In certain embodiments, monitoring module 40 is operable to generate a unique identifier for each screen. As an example, the unique identifier for a screen may include a hash code generated by applying a hashing algorithm to the data stream in the interaction information associated with the screen. The stored instance of the screen may be stored as an object. An example technique for generating the hash code for storing the instance of a screen is described in more detail below with reference to FIG. 8.

The raw data stream interaction information may be processed and stored such that the raw 3270 data is stored with a reference to the state identifier. In certain embodiments, input is identified and stored with the associated state identifiers of the source state and the destination state that bounded this input (e.g., the 3270 screen that was present before the user input stream and the 3270 screen that was presented to the user as a result of the input stream). The input stream itself may be stored as the fields on the source state that were changed, what the changes were, and the action key invoked (e.g., identified by an AID).

In certain embodiments, for each screen encountered during the interaction session, monitoring module 40 may determine whether a stored instance of the screen already exists, the stored instance of the screen comprising a stored screen object for the screen previously generated for a previous encounter with a screen matching this screen. To determine whether a stored instance of the screen exists, monitoring module 40 may determining a unique identifier for the screen, access an index of unique identifiers each associated with a corresponding screen, and determine whether the unique identifier of the screen matches a unique identifier of a stored instance of a screen to determine whether a stored instance of the screen exists.

If monitoring module 40 determines that a stored instance of the screen exists, monitoring module 40 may retrieve the stored instance of the screen and use the retrieved instance when generating the trace for the interaction session. If monitoring module 40 determines that a stored instance of the screen does not exist, monitoring module 40 may generating a unique identifier for the screen and store an instance of the screen indexed by the unique identifier for the screen, the stored instance for the screen comprising a screen object of the screen.

Storing and indexing instances of encountered screens may save storage space by allowing monitoring module to simply refer to a stored copy of a screen in the trace for an interaction session rather than storing multiple instances of identical screens. Moreover, it may facilitate the generation of usage statistics by monitoring module 40.

The trace of an interaction session may reflect each state encountered during the interaction session and any actions requested during the interaction session, including the flow from state to state of the interaction session. As described above, monitoring module 40 may generate traces for a number of interaction sessions between agent systems 16 and application 18 of legacy host system 12.

Monitoring module 40 may generate, based on the traces of the interaction sessions, a model of the interaction sessions, the model including the traces for each of the interaction sessions. For example, monitoring module 40 may analyze the traces for each of a number of interaction sessions. Monitoring module 40 may determine each of the states (e.g., screens) that have been encountered during the interaction sessions and determine each possible transition from each state. In certain embodiments, the model comprises a combined state graph, which may include a statistical finite state machine graph of the interaction sessions, the statistical finite state machine graph including at least a portion of the traces for the interaction sessions.

The generated model may include one or more use statistics for one or more nodes of the statistical finite state machine graph. In certain embodiments, the statistical finite state machine is created by counting each observation of a named panel for the state statistics. The transitions may include, for example, any input data and AID key invocation that results in the user being transitioned from a source state (e.g., a named 3270 screen) to a destination state (e.g., a resulting named 3270 screen). Monitoring module 40 may facilitate generation of one or more displays associated with the statistical finite state machine graph. Various example displays are described in more detail below with reference to FIGS. 9 through 12.

The following describes a particular example interaction session and associated partial operation of system 10 according to certain embodiments of the present invention. This example is provided for illustrative purposes only and should not be used to limit the present invention.

As described above, monitoring module 40 may collect interaction information for one or more interaction sessions associated with one or more agent systems 16. In embodiments in which monitoring module 40 collects interaction information regarding multiple interaction sessions that are each associated with a different agent system 16, monitoring module 40 may collect the interaction information for each of the interaction sessions in parallel, if appropriate. In certain embodiments, a portion or all of the functions performed by monitoring module 40 are performed automatically, substantially without human interaction.

Additionally, throughout this description, modeling of an application 18 of legacy host system 12 is primarily described. It should be understood, however, that the present invention contemplates modeling a single application 18, multiple applications 18, and legacy host system 12 (i.e., or more generally, any computer system 12). For example, modeling legacy host system 12 may include modeling one or more applications 18 of legacy host system 12. As a particular example, modeling multiple applications 18 of legacy host system 12 may provide a model for legacy host system 12.

Particular embodiments of the present invention may provide one or more technical advantages. In certain embodiments, the present invention provides a mechanism to observe and store a plurality of, and potentially all, interactions between one or more agent systems 16 and one or more computer systems 12, such as one or more legacy host systems 12. The collected interaction information may be used to generate a model of the use and capabilities of computer system 12. In certain embodiments, the model includes a finite state machine model of the underlying computer system 12, generated through collection and analysis of interaction information of interaction sessions with computer system 12 (e.g., interaction sessions with one or more applications 18 of computer system 12), which may be augmented with actual use statistics (e.g., based on the interaction sessions of one or more agent systems 16 with computer system 12). Among other advantages, this model of computer system 12 may simplify encapsulation of business processes, threat and intrusion detection, and provision of an audit trail of computer system interaction.

In general, the present invention relates to building a knowledge base by collecting interaction information associated with agent interaction sessions with one or more applications 18 of computer system 12, such as one or more mainframe applications 18 of legacy host system 12. The collected interaction information may include selections made by the agent, data entered by the agent, display information, application flow information, or other suitable information. For example, certain embodiments of the present invention provide the ability to monitor what screens, what input data, and what action keys an agent is submitting to computer system 12 and what screens and what output data the computer system is generating in response. This may provide the ability to create a map through applications 18 of computer system 12 to perform certain transactions. The collected interaction information for each agent may be analyzed to generate a trace of the agent's interaction with computer system 12. Combining the traces of a number of agents may facilitate building the model of computer system 12, which, among other possible benefits, may allow developer to see how computer system 12 is being used by web users.

Example Uses of the Model of Legacy Host System 12

In certain embodiments, the model (e.g., statistical finite state machine) that is generated based on analysis of agent system 16 interaction sessions may provide computer system designers with a conceptual view of legacy host system 12, regardless of how legacy host system 12 was developed. For example, instead of requiring such developers to posses and modify the source code for COBOL applications 18, procedural diagrams for procedural systems, or object-oriented diagrams for object-oriented systems, the present invention may be able to model any suitable computer system (e.g., legacy host system 12) and provide not only a common representation through a statistical finite state machine, but also how the computer system is currently being used by agent systems 16. This representation may provide certain benefits for a number of applications, examples of which are provided below. The example benefits provided below are merely illustrative, may only be present in certain embodiments of the present invention, and are not intended to limit the scope of the present invention.

1.1 Service Creation for Web Services or Service Oriented Architectures

A service may include a specific function that a computing system (e.g., legacy host system 12) can perform that receives input data, performs some set of computational activities in response to the input data, and returns output data. Most computing systems perform a number of services that are constructed in a monolithic and are accessed only through user interfaces or internal to the system application interfaces.

For example, consider a monolithic order management system. This example system may perform the services of order entry, credit check, inventory availability checking, inventory reservation, order status check, order change, order cancel, or other suitable services. Exposing these atomic services as web services or services to be deployed into a service oriented architecture (SOA) may include isolating the service from the monolithic application, creating a well defined set of inputs and outputs, and creating a set of logic to drive the application through a micro-workflow to achieve the service.

1.1.1 Defining Services

In certain embodiments, by clustering the states in the statistical finite state machine based upon adjacency (i.e., a first state is adjacent to a second state if the first state can transition directly to the second state) and time of transition (e.g., the clock time identifying how long the agent system 16 was in a first state before transitioning to a second state), a set of probable services may be identified and presented to an analyst to determine appropriate services to create.

1.1.2 Separating the Statistical Finite State Machine by User Group

In certain embodiments, by clustering the statistical finite state machine by user group (e.g., source internet protocol (IP) address ranges of the agent systems 16), sub-graphs may be generated that indicate common usage patterns of sub-groups of agent systems 16. For some monolithic systems, it is common for several disparate user communities to access and use different aspects of the system in different workflows. Based on the captured source IP of some or all observations, the graph may be segmented by user group and each of the sub-statistical finite state machine graphs may be generated.

1.1.3 Creating Services

In certain embodiments, continuing with the example of the monolithic order management application, the statistical finite state machine representation of the order management application may be analyzed to determine the scope of the micro-workflow and appropriate navigation through that workflow based on example traces. The statistical finite state machine may assist in forming the input and output parameters based on the observed example traces.

1.1.4 Testing Services

In certain embodiments, by using the examples traces determined from actual agent interaction sessions, a library of input parameters and the resulting expected output parameters may be collected. This library may be invoked as a set of test-scripts to test a service created for an application 18. In one example, by providing observed input data, the returned output of a developed service may be compared to the observed output from the actual agent interaction sessions, and exceptions may be flagged, potentially automatically, where the output for the developed service differs from the output of the actual interaction sessions.

1.1.5 Trend Analysis

In certain embodiments, by segmenting the statistical finite state machines by date-stamp of activities, sub-graphs based on date may be created. These date-based sub-graphs may permit the impact of changes to the system usage to be analyzed. As an example, assume that the underlying computing system (e.g., legacy host system 12) has been upgraded to provide quicker transaction processing. Analysis of the transaction times before and after the date stamp between the two statistical finite state machine sub-graphs may allow a precise statistic on service performance to be calculated.

1.2 Intrusion Detection and Auditing

In certain embodiments, the statistical finite state machine provides a description of common use paths through an application 18 for normal business operations. When computing systems (e.g., legacy host system 12) are compromised and there is unauthorized access to the computing system with hostile intent, the use path of the intruder is often non-standard. For example, a trace of an interaction session by a hostile user may differ from traces of typical use by authorized or otherwise non-hostile agent systems 16. By comparing actual use patterns against the statistical finite state machine patterns, a probability of intrusion may be calculated based on how common a trace the user under observation is following versus the observed traces.

In certain embodiments, if the probability of intrusion exceeds a threshold probability and an intrusion alert is generated, the observation may provide partial or full audit information of the suspected intruder. The audit information on the suspected intrusion may include, for example, all of the observation of the trace, the source IP address, the date-stamp of all activities, the actual input and output interactions recorded during the intrusion, and any other suitable information according to particular needs. This may allow for quick and complete auditing of some or all activity with the system.

Figure 6:
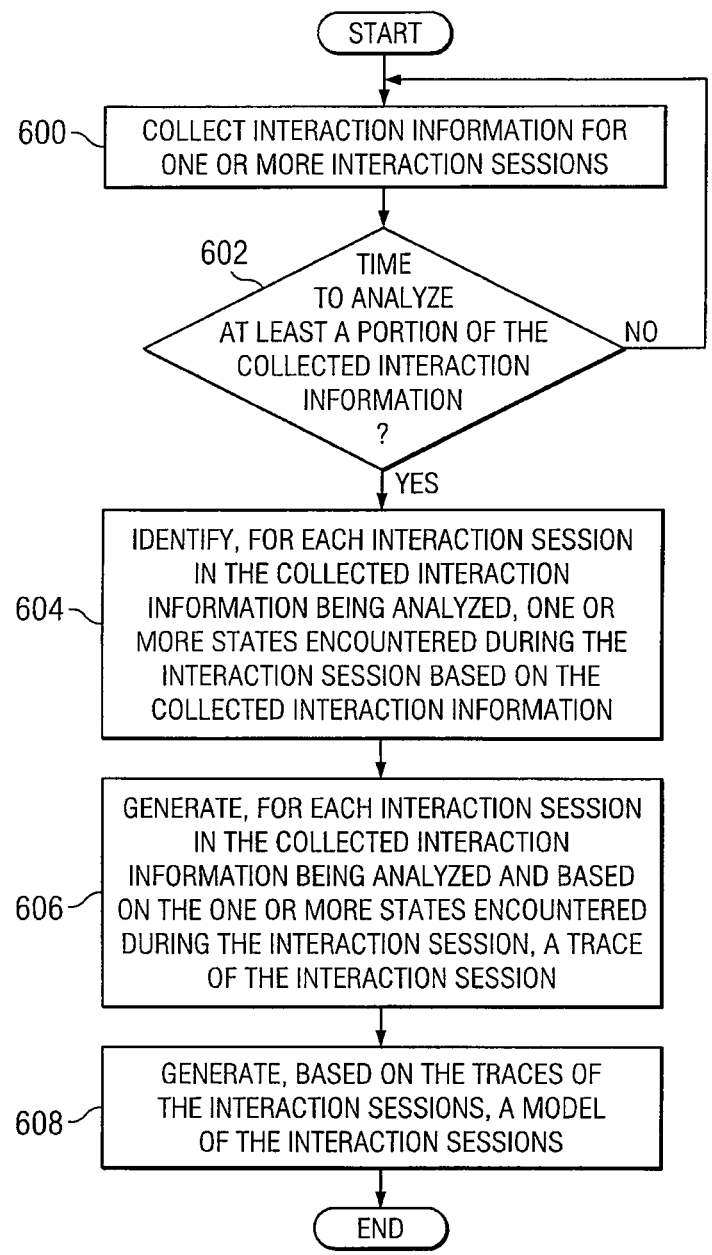
FIG. 6 illustrates an example method for modeling interactions with a computer system, according to certain embodiments of the present invention.

FIG. 6 illustrates an example method for modeling interactions with a computer system, according to certain embodiments of the present invention. As described above, it will be assumed for purposes of this description that the computer system comprises legacy host system 12; however, the present invention should not be limited to such embodiments.

At step 600, monitoring module 40 may collect interaction information for one or more interaction sessions. One or more agent systems 16 may each engage in one or more interaction sessions with legacy host system 12 (via server system 14), substantially simultaneously, at different times, or both. Each interaction session may be associated with a data stream that includes interaction information for the interaction session. In certain embodiments, the interaction information includes data for one or more screens, input data, output data, action key identifiers, or any other suitable data according to particular needs. In certain embodiments, the data stream for an interaction session is formatted as a terminal emulation protocol, such as TN3270, TN5250, NVT, VT220, or any other suitable terminal emulation protocol. Monitoring module 40 may collect interaction information for one or more of the interaction sessions by accessing the data stream for the interaction session and storing all or a portion of the data stream in a suitable storage medium. In certain embodiments, monitoring module 40 may be configured to filter what interaction information to collect. For example, monitoring module 40 may be configured to collect interaction information for interaction sessions associated with agent systems 16 in a particular network domain. Any other suitable filters are contemplated by the present invention.

At step 602, monitoring module 40 may determine whether it is time to analyze at least a portion of the collected interaction information. In certain embodiments, monitoring module 40 analyzes interaction information on a scheduled basis. For example, monitoring module 40 may analyze a batch of collected interacted information at a scheduled time (e.g., once a week). In other embodiments, monitoring module 40 may analyze collected interaction information in substantially real time, as monitoring module 40 is collecting interaction information for example. In certain embodiments, monitoring module 40 may be configured to analyze only a portion of collected interaction information. The portion may include, for example, interaction information collected for interaction sessions associated with agent systems 16 in a particular network domain. The collected and stored interaction information may be indexed, using one or more identifiers for example, in a manner that the interaction session associated with a particular set of interaction information can be determined.

If monitoring module 40 determines at step 602 that it is not time to analyze at least a portion of the collected interaction information, then monitoring module 40 may return to step 600 and continue to collect interaction information for one or more interaction sessions. If, however, monitoring module 40 determines at step 602 that it is time to analyze at least a portion of the collected interaction information, then monitoring module 40 may begin analyzing the collected interaction information. In certain embodiments, analyzing the collected interaction information may be performed in the following manner. It should be noted that even while monitoring module 40 is analyzing collected interaction information, monitoring module 40 may continue to collect interaction information.

At step 604, for each interaction session in the collected interaction information being analyzed, monitoring module 40 may identify one or more states encountered during the interaction session based on the collected interaction information, and at step 606 monitoring module 40 may generate, based on the one or more states encountered during the interaction session, a trace of the interaction session. In certain embodiments, monitoring module 40 may identify the one or more states encountered during the interaction session by performing a state recognition procedure on the interaction information for the interaction session being analyzed. Performing the state recognition procedure may include parsing the interaction information for the interaction session and determining one or more states encountered during the interaction session.

In certain embodiments, each interaction session may include one or more screens encountered during the interaction session and one or more actions initiated during the interaction session, each state of the interaction session comprising a screen encountered during the interaction session. In such embodiments, the collected interaction information for a session may include screen interaction information, the screen interaction information being associated with the one or more screens encountered during the interaction session.

The screen interaction information may include data for one or more of the following: (1) one or more screens encountered during the interaction session; (2) data input into a screen using an agent computer system; (3) data output into a screen from the computer system; (4) one or more AIDs for action keys engaged during the interaction session; and (5) any other suitable data.

As monitoring module 40 parses the interaction information for a particular interaction session, monitoring module may identify, in part, screens encountered during the interaction session. State identification may be determined using field mark positions within the 3270 data stream, as well as the attributes of the field within the 3270 data stream. For example, when a screen is processed by monitoring module 40, one or more rules may be generated. These rules may specify the fields that exist in the screen, the names of the fields, and how those fields are formatted. These rules may define a data structure or object for that screen. An example panel object for storing an instance of a screen is described below with reference to FIG. 8.

Each screen may labeled with a hash-code representation or other suitable representation of the field mark positions. Each screen, which may include associated input data or output data and one or more AIDs for action keys engaged, may represent a state of application 18. As monitoring module 40 encounters screens during its analysis of interaction information, monitoring module 40 may store an instance of the screen. The stored instance of the screen may include any suitable information, according to particular needs. In certain embodiments, monitoring module 40 is operable to generate a unique identifier for each screen. As an example, the unique identifier for a screen may include a hash code generated by applying a hashing algorithm to the data stream in the interaction information associated with the screen. The stored instance of the screen may be stored as an object. An example technique for generating the hash code for storing the instance of a screen is described in more detail below with reference to FIG. 8.

The raw data stream interaction information may be processed and stored such that the raw 3270 data is stored with a reference to the state identifier. In certain embodiments, input is identified and stored with the associated state identifiers of the source state and the destination state that bounded this input (e.g., the 3270 screen that was present before the user input stream and the 3270 screen that was presented to the user as a result of the input stream). The input stream itself may be stored as the fields on the source state that were changed, what the changes were, and the action key invoked (e.g., identified by an AID).

In certain embodiments, for each screen encountered during the interaction session, monitoring module 40 may determine whether a stored instance of the screen already exists, the stored instance of the screen comprising a stored screen object for the screen previously generated for a previous encounter with a screen matching this screen. To determine whether a stored instance of the screen exists, monitoring module 40 may determining a unique identifier for the screen, access an index of unique identifiers each associated with a corresponding screen, and determine whether the unique identifier of the screen matches a unique identifier of a stored instance of a screen to determine whether a stored instance of the screen exists.

If monitoring module 40 determines that a stored instance of the screen exists, monitoring module 40 may retrieve the stored instance of the screen and use the retrieved instance when generating the trace for the interaction session. If monitoring module 40 determines that a stored instance of the screen does not exist, monitoring module 40 may generating a unique identifier for the screen and store an instance of the screen indexed by the unique identifier for the screen, the stored instance for the screen comprising a screen object of the screen.

Storing and indexing instances of encountered screens may save storage space by allowing monitoring module to simply refer to a stored copy of a screen in the trace for an interaction session rather than storing multiple instances of identical screens. Moreover, it may facilitate the generation of usage statistics by monitoring module 40.

The trace of an interaction session may reflect each state encountered during the interaction session and any actions requested during the interaction session, including the flow from state to state of the interaction session. As described above, monitoring module 40 may generate traces for a number of interaction sessions between agent systems 16 and application 18 of legacy host system 12.

At step 608, monitoring module 40 may generate, based on the traces of the interaction sessions, a model of the interaction sessions, the model including the traces for each of the interaction sessions. For example, monitoring module 40 may analyze the traces for each of a number of interaction sessions. Monitoring module 40 may determine each of the states (e.g., screens) that have been encountered during the interaction sessions and determine each possible transition from each state. In certain embodiments, the model comprises a combined state graph, which may include a statistical finite state machine graph of the interaction sessions, the statistical finite state machine graph including at least a portion of the traces for the interaction sessions.

The generated model may include one or more use statistics for one or more nodes of the statistical finite state machine graph. In certain embodiments, the statistical finite state machine is created by counting each observation of a named panel for the state statistics. The transitions may include, for example, any input data and AID key invocation that results in the user being transitioned from a source state (e.g., a named 3270 screen) to a destination state (e.g., a resulting named 3270 screen). Monitoring module 40 may facilitate generation of one or more displays associated with the statistical finite state machine graph. Various example displays are described in more detail below with reference to FIGS. 9 through 12.

Although a particular method for modeling interactions with a computer system has been described with reference to FIG. 6, the present invention contemplates any suitable method for modeling interactions with a computer system in accordance with the present invention. Thus, certain of the steps described with reference to FIG. 6 may take place substantially simultaneously and/or in different orders than as illustrated and described. Moreover, components of system 10 or other systems may use methods with additional steps, fewer steps, and/or different steps, so long as the methods remain appropriate.

Figure 7:
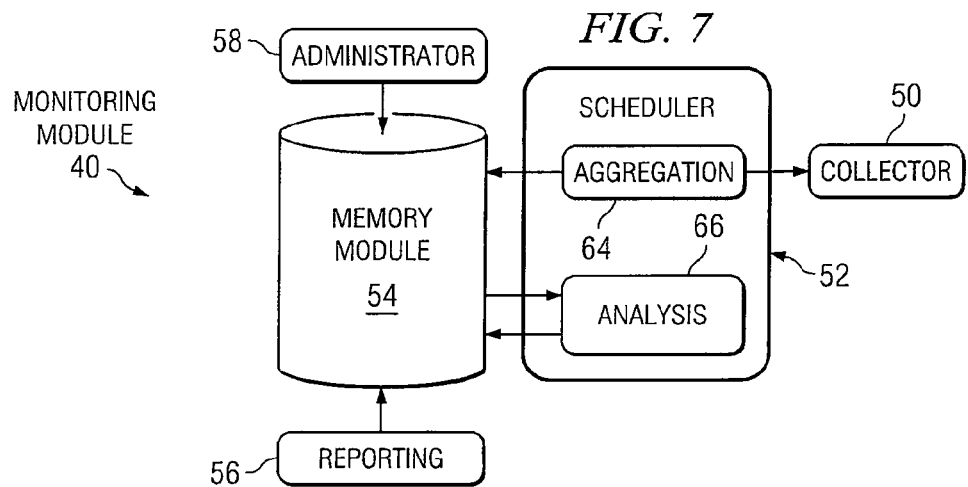
FIG. 7 illustrates an example monitoring module according to certain embodiments of the present invention.

FIG. 7 illustrates an example monitoring module 40 according to certain embodiments of the present invention. Monitoring module 40 and each of its components may include any suitable combination of hardware, firmware, and software according to particular needs. Monitoring module may be implemented using one or more computers at one or more locations that may share data storage, communications, or other resources according to particular needs. For example, functionality described in connection with monitoring module 40 may be provided using a single computer system, which in a particular embodiment might include a conventional desktop or laptop computer or a server computer. Furthermore, functionality described in connection with monitoring module 40 may be provided using any suitable software components. Each computer system may include one or more suitable input devices, output devices, mass storage media, processing units, memory units, or other components for receiving, processing, storing, and communicating information according to the operation of system 10.

Although monitoring module 40 is described below as including certain numbers and types of components and certain divisions of functionality among those components, the present invention contemplates monitoring module 40 including any suitable numbers and types of components and any suitable divisions of functionality among those components. Moreover, the present invention contemplates monitoring module 40 being coupled to any suitable components of system 10 according to particular needs. For example, monitoring module 40 may be integral to legacy host system 12, server system 14, and/or one or more agent systems 16. As another example, monitoring module 40 may be an independent component in system 10, coupled to one or more other components of system 10 by a network or other link.

In certain embodiments, as illustrated in FIG. 7, monitoring module 40 may include a collector module 50, a scheduler module 52, a memory module 54, a reporting module 56, and an administrator module 58. Each of these example modules is described in more detail below.

Monitoring module 40 may include one or more collector modules 50, referred to throughout the remainder of this description primarily in the singular. In certain embodiments, collector module 50 is based on a PSEUDO STREAMS ENVIRONMENT (PSE) server engine manufactured by OPENCONNECT SYSTEMS, INC.; however, the present invention is not limited to such embodiments. In general, collector module 50 is operable to access and monitor the data streams of interaction sessions of agent systems 16 and to store the interaction information for those data streams. For example, collector module 50 may be operable to access and monitor, or snoop, one or more links of system 10 (e.g., via which an interaction session may be occurring) to collect terminal format data streams associated with interaction sessions. As a particular example, collector module 50 may monitor links for TN3270 format (or other terminal data format) data streams of interaction sessions. Collector module 50 may compress and/or encrypt the collected information for the interaction sessions into one or more files, which may be compressed and/or encrypted if appropriate.

In certain embodiments, collector module 50 is configured at its installation. Configuration information for collector module 50 may be determined at installation of collector module 50 and may include one or more of the following, for example: one or more "listen" IP addresses/ports; one or more collection network devices; maximum disk space to use; an encryption seed phrase; and any other suitable information. A secure socket layer (SSL) certificate may be generated automatically using built-in default parameters.

During configuration of collector module 50, the address, port, userID, and password of an aggregation module (e.g., aggregation module 64, described below) may be requested, and a registration form post may be submitted to the aggregation module using HTTP over SSL (HTTPS). During the registration request, the public SSL certificate of the aggregation module may be retrieved from an SSL library. If the registration request succeeds, the public SSL certificate of the aggregation module may be stored in a client certificate database. In certain embodiments, SSL client authentication is used to validate any aggregation module requests (e.g., status, configure, getfilelist, getfile, deletefile). Collector module 50 may be restarted, at which point collector module 50 may be ready to collect interaction information for interaction sessions. Although this particular technique for configuration of collector module 50 has been described, the present invention contemplates collector module 50 being configured in any suitable manner according to particular needs.

Collector module 50 may be associated with one or more service streams, in the PSE server engine for example. As a first example, collector module 50 may be associated with an HTTPS stream. In certain embodiments, the only development for the HTTPS stream will be a set of macro-parsed HTML forms for configuration setting and file handling. As a second example, collector module 50 may be associated with a collection stream that includes the terminal formatted data collected by collector module 50.

In certain embodiments, various modules may be developed for collector module 50 to process the collected interaction information of interaction sessions. Although particular example modules are described below, the present invention contemplates collected interaction information being processed in any suitable manner according to particular needs.

First, collector module 50 may include a pcap/winpcap module, which may include a driver module that wraps a pcap library and a winpcap. The pcap/wincap module may accept configuration information via M_CTL messages or other suitable messages, and may pass up packets as M_DATA messages as they are collected.

Second, collector module 50 may include the collector itself, which may include the primary scheduling module that handles configuration of pcap, the creation of MUX streams to which to write packet data based on SRC/DST IP/Ports, and the routing of data to those streams.

Third, collector module 50 may include a tcp_assemble module, which may accept raw data packets of terminal formatted data for one or more single IP/port pairs and reconstruct the raw data passed on the TCP stream by looking for retransmissions and acknowledgments. The tcp_assemble module may write reconstructed data down the write side of the data stream with a flag that indicates what direction the data was being transmitted.

Fourth, collector module 50 may include a tn_parse module, which may parse the telnet (TN) level of the data stream (i.e., the terminal formatted data stream) and break that data into TN3270 commands (or other commands, depending on the terminal emulation protocol being used). The tn_parse module may also pass any relevant header information as header records (e.g., terminal type negotiated, logical unit (LU) negotiated, or other header information) down the write side of the module.

Fifth, collector module 50 may include a compress module, which may be operable to compress and/or decompress data that is passed through collector module 50. The compression/decompression may be performed in any suitable manner, according to particular needs.

Sixth, collector module 50 may include an encrypt module, which may be operable to encrypt and/or decrypt data that is passed through collector module 50. The encryption/decryption may be performed in any suitable manner, according to particular needs.

Seventh, collector module 50 may include a file module, which may read and/or write length-delimited messages into a recoverable file format.

While a single collector module 50 has been primarily described, the present invention contemplates monitoring module 40 including any suitable number of collector modules 50. For example, monitoring module 40 may include collector modules 50 each corresponding to a different legacy host system 12. However, the present invention also contemplates a single collector module 50 collecting interaction information for a number of legacy host systems 12, if appropriate.

In certain embodiments, monitoring module 40 includes a scheduler module 52. In general, scheduler module 52 is operable to aggregate data files from collector module 50 and to store the raw data in memory module 54 based on a scheduled basis, in real time, at any other suitable interval. Scheduler module 52 may perform certain analyses of the collected data. Scheduler module 52 may include an aggregation module 64 and an analysis module 66, each of which is described below in more detail.

Aggregation module 64 may be operable to collect raw data files (e.g., interaction information of interaction sessions) collected or created by collector module 50, store the gathered interaction information in memory module 54, facilitate the removal of the collected interaction information from collector module 50, and provide basic administration and status of the interaction information collecting system as a whole. Aggregation module 64 may perform one or more of these functions according to one or more schedules. For example, aggregation module 64 may gather and store the raw data files (e.g., of interaction sessions) from a particular collector module 50 on a scheduled basis. The time interval specified in the schedule may be substantially continuous, hourly, daily, weekly, or at any other suitable interval.

Aggregation module 64 may be installed and configured in any suitable manner, according to particular needs. A particular example technique for installing and configuring aggregation module 64 is described below.

In certain embodiments, an install script/wizard may be provided for the aggregation module 64. The install script may be operable to unpackage the aggregation module 64, prompt for the install location, setup a WIN32 (manufactured by MICROSOFT) service platform or other suitable platform, and start the aggregator process. Implementation of the installation of aggregation module 64 may be platform-dependent. For example, the installation may be implemented using Inno or InstallShield wizard for WIN32 manufactured by MICROSOFT, a pkgadd utility for SOLARIS, or RED HAT PACKAGE MANAGER (RPM) for LINUX.

Once started, the installation process for installing aggregation module 64 may set up an arbitrary port and prompt administrator 58 to direct a browser at the arbitrary port to complete the configuration process. Once the browser connects to the arbitrary port, administrator 58 may be presented with a welcome screen and a prompt to start the configuration wizard for configuring aggregation module 64. The configuration wizard may prompt for configuration information, such as port, administrator ILL, new password, and encryption seed for SSL and trace file encryption/decryption. When configuration is complete, a "Finish" screen and button may be presented that, when executed, may restart the aggregation module 64 with the new configuration. All other configuration may be set through an administration interface associated with administrator module 58.

As described above, monitoring module 40 may include an administrator module 58, which may include an associated administrator interface. Configuration of the aggregation module 64 may be performed using the administrator interface of administrator module 58. For example, aggregation module 64 may be configured using the administrator interface via HTTPS using a browser, such as MICROSOFT INTERNET EXPLORER, NETSCAPE NAVIGATOR, or any other suitable browser. In certain embodiments, access to the configuration for aggregation module 64 may use authentication techniques and be via an SSL port. An HTML presentation may be generated using HTML macro language scripts. Section tags may be presented on a portion of the display for easy navigation to configuration pages. The configuration hierarchy may be organized in any suitable manner. As just one example organization of the configuration hierarchy, primary and secondary headings may represent left-side panel anchors. The next level of heading may be the right side page with children representing components on that page. Those headings may be organized according to the following hierarchy, which merely provided as an example:

A. Server
  1. Status
    a. Version
    b. Start time
    c. Up time
    d. Current number of collector modules 50 aggregating
    e. Total number collections aggregated during up time
    f. Panel analysis start time (idle or timestamp)
    g. Last completed panel analysis: start/end times
    h. Next scheduled panel analysis: start/end times
    i. Transition analysis start time (idle or timestamp)
    j. Last completed transition analysis: start/end times
    k. Next scheduled transition analysis: start/end times
    l. Total number of records analyzed
    m. Total number of transitions analyzed
    n. Total number of panels analyzed
    o. Start Panel Analysis button
    p. Start Transition Analysis button
    q. Refresh
  2. Restart
  3. Shutdown
  4. Logout
B. Configuration
  1. Access
    a. SSL Access Port
    b. User ID
    c. Change User Password/Confirm
    d. Save/Cancel 2. Database
  a. Host name
  b. User ID
  c. Password
  d. Save/Cancel
3. Miscellaneous
  a. Encryption Seed Phrase
  b. Purge collector cache when collector module 50 enabled/updated
  c. Save/Cancel
4. Panel Analysis Schedule
  a. Recurrence Pattern
    i. Start Time
    ii. Maximum time allowed per recurrence
    iii. Hourly
      1. Every x hours
      2. Times per day
    iv. Daily
      1. Every x days
    v. Weekly
      1. Every x weeks
      2. Selectable days SMTWTFS
5. Range of Recurrence
  a. Effective immediately/Start by x date
  b. No end date/End by x date
6. Save/Cancel
7. Transition Analysis Schedule
  a. Recurrence Pattern
    i. Start Time
    ii. Maximum time allowed per recurrence
    iii. Hourly
      1. Every x hours
      2. Times per day
    iv. Daily
      1. Every x days
    v. Weekly
      1. Every x weeks
      2. Selectable days SMTWTFS
  b. Range of Recurrence
    i. Effective immediately/Start by x date
    ii. No end date/End by x date
  c. Save/Cancel
C. Collector Modules 50
1. Group Configuration
  a. Group List
  b. New Group
  c. Delete Group
  d. Edit Group
    i. Group name
    ii. Mainframe Monitoring (Add, Edit, Delete IP Port list)
    iii. Aggregation Schedule
1. Recurrence Pattern
  a. Start Time
  b. Maximum time allowed per recurrence
  c. Hourly
    i. Every x hours
    ii. Times per day
  d. Daily
    i. Every x days
  e. Weekly
    i. Every x weeks
    ii. Selectable days SMTWTFS
2. Range of Recurrence
  i. Effective immediately/Start by x date
  ii. No end date/End by x date
  iv. Save/Cancel
2. Collector Module 50 Configuration
  a. Collector Module 50 List
    i. IP address (non-editable)
    ii. Assigned Group
    iii. Save/Cancel
  b. Delete Collector Module 50
3. Status/Control
  a. Collector Module 50 List—Each listed Collector Module 50 shows:
    i. Select box
    ii. IP Address
    iii. Port
    iv. Collector Module 50 Version
    v. Group
    vi. Configuration status
      1. Current
      2. Update—Needs configuration update
    vii. State
      1. No Response
      2. Disabled
      3. Collecting
    viii. Up time
    ix. Total number of collections created
    x. Timestamp of last collection created
    xi. Number collections pending aggregation
    xii. Current aggregation start time
    xiii. Last completed aggregation: start/end times
    xiv. Next scheduled aggregation: start/end times
  b. Select All
  c. Delect All
  d. Refresh (selected collectors)
  e. Disable (selected collectors)
  f. Enable/Update (selected collectors)
  g. Start Aggregation (selected collectors)
D. Logging
1. View Log Collector modules 50 may register with aggregation module 64. For example, aggregation module 64 may build its collector configuration via a registration process. In certain embodiments, when a collector module 50 is installed and initially configured, the collector module 50 may connect to the aggregation module 64 via an SSL port and register itself using a URL, such as the following:

https://<aggregator name/ip>:<aggregator port>/register.htm1?ipaddress=x.x.x.x&port=yyyy&version=z.z.z Certain parameters may be passed from a registering collector module 50 to aggregation module 64. For example, parameters passed within the URL may include IP address, port, and version of the registering collector module 50. The IP address and port may be used by the collector module 50 for purposes of aggregation and collector status and configuration. If the address passed is 0.0.0.0, aggregation module 64 may obtain the IP address from the TCP header. Thus, in certain embodiments, it may be appropriate for collector module 50 and aggregation module 64 not to be separated by a proxy server. The IP address may also serve as the ID of the collector module 50 (e.g., collectorID). A collector module 50 that is registering for the first time may be assigned to the "Default" collector group. Aggregation module 64 may store the registration data for a collector module 50 in the configuration files for aggregation module 64. Once registered successfully, a collector module 50 may restart and begin "listening" on the specified IP address and port for interaction information.

In embodiments in which monitoring module 40 includes multiple collector modules 50, the collector modules 50 may be organized into one or more groups, if appropriate. The groups may be configured in any suitable manner. As just one example, using the administration interface of administrator module 58, collector groups may defined to specify the legacy host system 12 IP addresses and ports that members of the collector group are to monitor and during which time periods aggregation module 64 is to access the interaction information by the members of the group. The group to which a collector module 50 is assigned may be stored in the configuration files of aggregation module 64.

A collector status/control page may show status information for each registered collector module 50. The IP address, port, and version may be stored locally as a result of the registration process. The group, configuration status, and aggregation timestamps may also be stored locally. Additional status information may be provided directly by the collector module 50, using an HTTP GET method and the following URL for example:

https://<collector ip>:<collector port>/status.html.

The collector status/control page may allow one or more collector modules 50 to be selected. For the selected collector modules 50, administrator module 58 may execute a status refresh, disable collector modules 50, or enable/update collector modules 50. A refresh action may obtain fresh status for each collector module 50. The disable action may reconfigure a collector module 50 with an empty legacy host system 12 list, effectively putting the collector module 50 into a non-collecting state. Enable/Update updates a collector module 50 with the legacy host system 12 monitoring list for the group of the collector module 50 and enables the collector module 50 to begin collecting interaction information for interaction sessions associated with those legacy host systems 12. As an example, aggregation module 64 may configure collector module 50 using the following URL:

```
https://<collector ip>:<collector port>/
    configure.html ?mflist=<mflist>&purge=<true:false>,
``` where <mflist> is the legacy host system 12 monitoring list in the form of IP1:port1, IP2:port2, and so on. If the mflist is empty, collector module 50 may stop collecting (e.g., enter a disabled state). If "purge collector cache" is set to TRUE, then the purge parameter may be TRUE, and collector module 50 may delete all interaction information files in its cache.

In certain embodiments, aggregation module 64 remains in an idle state until a scheduled action is triggered. The scheduled action may include, for example, gather raw data from one or more collector modules 50. The aggregation action may be scheduled by collector group, where one or more collector modules 50 are members of a group. When an aggregation begins, aggregation module 64 may connect to collector module 50 and send a getFileList or other suitable request. Collector module 50 may respond with a list of file names ready to be aggregated. If no files are available, then collector module 50 may return an empty list. Aggregation module 64 may iterate through the list returned by collector module 50 and sends collector module 50 a getFile or other suitable request. Collector module 50 may respond with the contents of the trace file. Aggregation module 64 may receive, decrypt, decompress, and parse the file into one or more database objects for storing in memory module 54. Once the data is stored in memory module 54, aggregation module 64 may send a deleteFile or other suitable request to collector module 50, instructing collector module 50 to remove its copy of the raw data from the cache of collector module 50. In certain embodiments, the various requests may be made using uniform resource locators (URLs), which may include the following:

```
getFileList URL: https://<collector ip>:<collector port>/getFileList.html
getFile URL: https://<collector ip>:<collector port>/
    getFile.html?file=<filename>
deleteFile URL: https://<collector ip>:<collector port>/
    deleteFile.html?file=<filename>
```

The cycle may be repeated until collector module 50 returns an error for the getFile request or the aggregation time period has expired.

In certain embodiments, aggregation module 64 is based on a PSE server engine. Additionally, in certain embodiments, the Java Virtual Machine may be used to handle interaction with memory module 54. Aggregation module 64 may comprise, for example, a single process using the PSE engine. In certain embodiments, the primary functional areas within this process include a scheduler service, one or more collector reader streams, one or more HTTP administration SSL streams, and a post-install HTML configuration wizard.

A scheduler service of scheduler module 52 may be responsible for setting timers that manage starting and closing reader streams and analysis streams based on schedules in the configuration or manual administration starts. Each collector reader stream, started by the scheduler service, may handle an aggregation cycle with a specified collector 50. The HTTP administration SSL stream may comprise an interface for handling configuration and status reporting via browser access to the administration port of administrator module 58 using HTML. The HTML pages are created and processed using the PSE macro language. In certain embodiments, access to this interface is provided after user authentication. The post-install HTML configuration wizard provides access to the configuration wizard to set up minimal configuration after an install. In certain embodiments, the post-install HTML configuration wizard is a non-SSL HTTP stream. The wizard may comprise a PSE macro language HTML. In certain embodiments, once the initial configuration is saved, this stream becomes inactive.

As described above, monitoring module 40 may include a memory module 54. Although memory module 54 is referred to in the singular, the present invention contemplates monitoring module 40 including any suitable number of memory modules 54. Additionally, the present invention contemplates monitoring module 40 sharing memory resources with any other suitable components of system 10, according to particular needs.

Memory module 54 may include any suitable memory or database module and may take the form of volatile or non-volatile memory including, without limitation, magnetic media, optical media, random access memory (RAM), read-only memory (ROM), removable media, or any other suitable local or memory component. In particular embodiments, memory module 54 includes one or more SQL servers.

In certain embodiments, memory module 54 is operable to store collected interaction information. Additionally, memory module 54 may store screen objects or other information generated from the analysis of collected interaction information.

Figure 8:
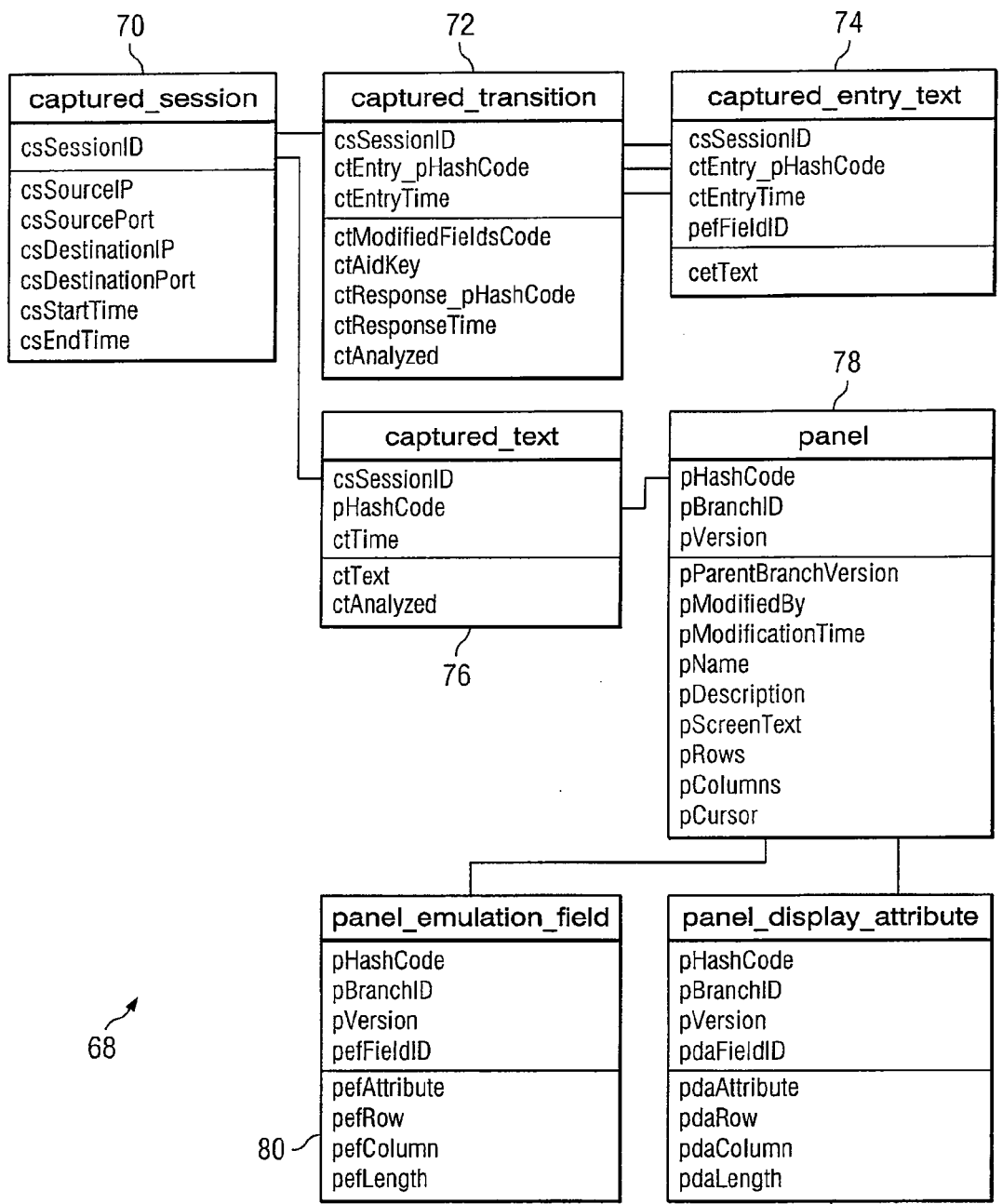
FIG. 8 illustrates an example database schema for the interaction information that may be stored in a memory module.

FIG. 8 illustrates an example database schema 68 for the interaction information that may be stored in memory module 54. Although a particular a particular database schema 68 is primarily illustrated and described, the present invention contemplates storing interaction information for interaction sessions in any suitable manner, according to particular needs. As each raw data stream from collector module 50 is aggregated by aggregation module 64, interaction information (e.g., raw panel and transition data) may be stored in memory module 54.

Database schema 68 may include a session object 72 (e.g., captured_session object 70), which may be created for each interaction session for which interaction information is collected and stored. Captured_session object 70 may form the root node of a hierarchy of objects for storing collected interaction information for an interaction session.

Captured_session object 70 may include values for one or more of the following: a session identifier (csSessionID); a source IP address (csSourceIP); a source port address (csSourcePort); a destination IP address (csDestinationIP); a destination port address (csDestinationPort); a session start time (csStartTime); a session end time (csEndTime); and any other suitable information. The csSessionID may be a unique identifier for the interaction session for which the interaction information is being stored. The csSessionID may be generated using the start timestamp, and the source and destination IP address/ports as the key of the table, storing the source and destination IP addresses/ports, and the interaction session start time and end time.

The child objects of the captured_session object 70 for an interaction session may include one or more of the following: a captured_transition object 72; a captured_entry text object 74; a captured_text object 76; a panel object 78; a panel_emulation_field object 80; and a panel_display_attribute object 82.

Database schema 68 may include one or more panel objects 78. For purposes of this description, the terms "panel" and "screen" may be used interchangeably. Each created panel object 78 may correspond to a screen encountered during an interaction session. In certain embodiments, for each panel instance that is stored, three records may be stored in panel object 78. These three records may be generated for the hash codes (or other identifying values) calculated from the field marks on the panel and the attributes of each field of the panel. A top-level hash code may be generated from the field marks and positions (cursor position may be used on a screen that has no field marks). A secondary hash code may further use the "base" TN3270 attributes (e.g., protected, unprotected, intense, non-display, or any other suitable base attributes). A third hash code may further include any extended attributes on the field (e.g., reverse, underline, blink, color, or other suitable extended attributes). In certain embodiments, if there are no extended attributes on the fields, the third code may not be used, if appropriate. In certain embodiments, the panel objects 78 are created only if a panel object of that hash code does not already exist. Each of the panel object 78 may be indexed by the panel hash code uniquely identifying a panel. Thus, for each panelID, one to three panel records may be generated.

Panel object 78 may include one or more of the following attributes: pHashCode; pBranchID; pVersion; pParentBranchVersion; pModifiedBy; pModificationTime; pName; pDescription; pScreenText; pRows; pColumns; and pCursor.

The current panel text data of interaction session may be stored in captured_text object 76 using the sessionID, panel hash code, and timestamp as a key. Each time the user interacts with legacy host system 12, a transition record may be stored that includes the sessionID, starting panel hash code, timestamp as a key with a modified fields hash code, action ID key, response panel hash code, and response timestamp into captured_transition object 72. Raw interaction data for the individual modified fields in a panel may be stored in captured_entry_text object 74. Textual data from legacy host system 12, as well as entry field data, may be encrypted before being inserted into the database objects. "Fake" transition records may be entered for connection start and termination using "−1" as the hash code for either the entry or response panel codes.

Returning to FIG. 7, as described above, scheduler module 52 may include analysis module 66. Analysis module 66 may include a panel analysis sub-module and a transition analysis sub-module. These two sub-modules may operate on the raw interaction information that is input into memory module 54 by aggregation module 64. The panel analysis and transition analysis sub-modules may use the raw interaction information to construct rules on the panels, perform statistical analysis regarding the screens and screen transitions, and build summary tables from the transition data (which may be used to generate various displays). In certain embodiments, analysis module 66 is written in JAVA and may be launched on a configurable schedule by scheduler module 52; however, the present invention is not intended to be so limited.

Analysis module 66 may include one or more configurable parameters. For example, analysis module 66 may include a "User Network Groups" parameter. An administrator may configure a set of named user network groups that each contain a set of IP ranges that may be used to deconstruct the raw transition data. A "Default" network group may be used to include all records that do not match a defined user network group. As another example, analysis module 66 may include a "Computer System Groups" parameter. An administrator may configure a set of named computer systems (e.g., legacy host systems 12) that each contain a set of IP addresses and ports for all of the gateways associated with that computer system. A "Default" computer system may be used to contain all records that do not match a defined computer system IP address. As another example, analysis module 66 may include a "Time Interval" parameter. The administrator may configure the "bucket size" used to separate when screens and transitions occur. In certain embodiments, valid bucket sizes may include five minutes, ten minutes, fifteen minutes, thirty minutes, one hour, two hours, four hours, eight hours, twelve hours, or twenty-four hours, although any suitable bucket size may be appropriate. A default bucket size may be one hour. Using a smaller bucket size may increase database storage size, while using larger bucket sizes may decrease database storage size. If the bucket size is changed, it may be useful to reanalyze raw transition data on the next run of the transition analysis sub-module. Reporting module (described more fully below) may aggregate data from multiple buckets based on entered report criteria. In certain embodiments, the bucket size merely affects the minimum time periods that can be queried.

Analysis module 66 may be operable to analyze screens, using the panel analysis sub-module for example. During a panel analysis cycle, new captured_text records may be sorted into which screens have been encountered. The text may be compared against what is already known about the screen. If a possible change is detected, existing raw records of the panel text may be used to perform a rebuild of the rule information for the screen. During a rule rebuild, the text data may be used to determine which fields and text cells on the screen have varying data and which have constant data, so that it can be determined if the field (or part of a field) is output data on the panel. Transition entry data may be used to determine which fields are inputs used by agent systems 16. For fields that have been determined to be either input, output, or input/output areas, type analysis may be performed to determine if the field is a date, number, set of entries, or a generic string. The invariant data on the screen may be stored unencrypted in the panel table as its pScreenText data to be used by the panel viewer in the reporting tool.

Analysis module 66 may be operable to analyze transitions between screens. During a transition analysis cycle, new transition records may be sorted into the configured buckets by source and destination IP addresses (into the appropriate user network and computer system groups), entry and response panel codes, and timestamp. Panel usage buckets may also be created based on the same criteria. The "fake" connection and disconnection panels may only be represented by the transition buckets.

As described above, monitoring module 40 may include an administrator module 58, which may be operable to facilitate various configuration functions. For example, administrator module 58 may facilitate configuration of user accounts and groups, service and transaction security, database users, and other aspects of system 10.

Administrator module 58 may include one or more editors for administration of system 10. For example, administrator module 58 may include tabs for monitoring interaction sessions, users, groups, JAVA Enterprise Edition hosts, database users, and database access roles. Administrator module 58 may include a service editor, which may be used to control service versioning and permissions. An entry for each service registered in memory module 54. When a service is selected, a display may be shown that allows an administrator to configure which service version to use, whether the service is enabled, what session is to be used, and accessibility to the service or individual transactions (e.g., if service level accessibility is denied). Group and user overrides may be created, and versions and accessibility may be overridden.

Administrator module 58 may include an analysis editor, which may allow the parameters of scheduler module 52 to be configured. For example, the analysis editor may allow an administrator to configure the parameters time slice size, what user group networks exist, and what legacy host systems 12 exist. The analysis editor may allow an administrator to configure a single time interval, as well as multiple user group networks, and multiple definitions for legacy host systems 12. User group networks may allow an administrator to configure multiple network regions, where definitions for legacy host systems 12 may allow the user to configure multiple IP addresses that specify the gateway addresses for that legacy host system 12.

As described above, monitoring module 40 may include a reporting module 56. Reporting module 56 may allow a user to visually see what is occurring in association with one or more legacy host system 12. Reporting module 56 may provide any suitable type of display, according to particular needs. For example, the resulting finite state machine graph, possibly with usage statistics, may be presented to a user through a series of user interface screens to achieve one or more of the following: (1) an ability to understand the finite state machinery of the underlying application 18; (2) an ability to understand actual use patterns of the underlying application; (3) use patterns by a user community; (4) use patterns by time of day or date; and (4) any other suitable information, according to particular needs. Several example displays are described below. Each of the displays described below are provided merely as examples and should not be used to limit the present invention.

As a first example display, reporting module 56 may provide a "Panel Usage Overview" display, which may include an ordered list of screens that have been visited by a configured user network group and legacy host system 12 over a selected time interval. In certain embodiments, all buckets within the selected time interval may be summed to produce the Panel Usage Overview display.

Figure 9:
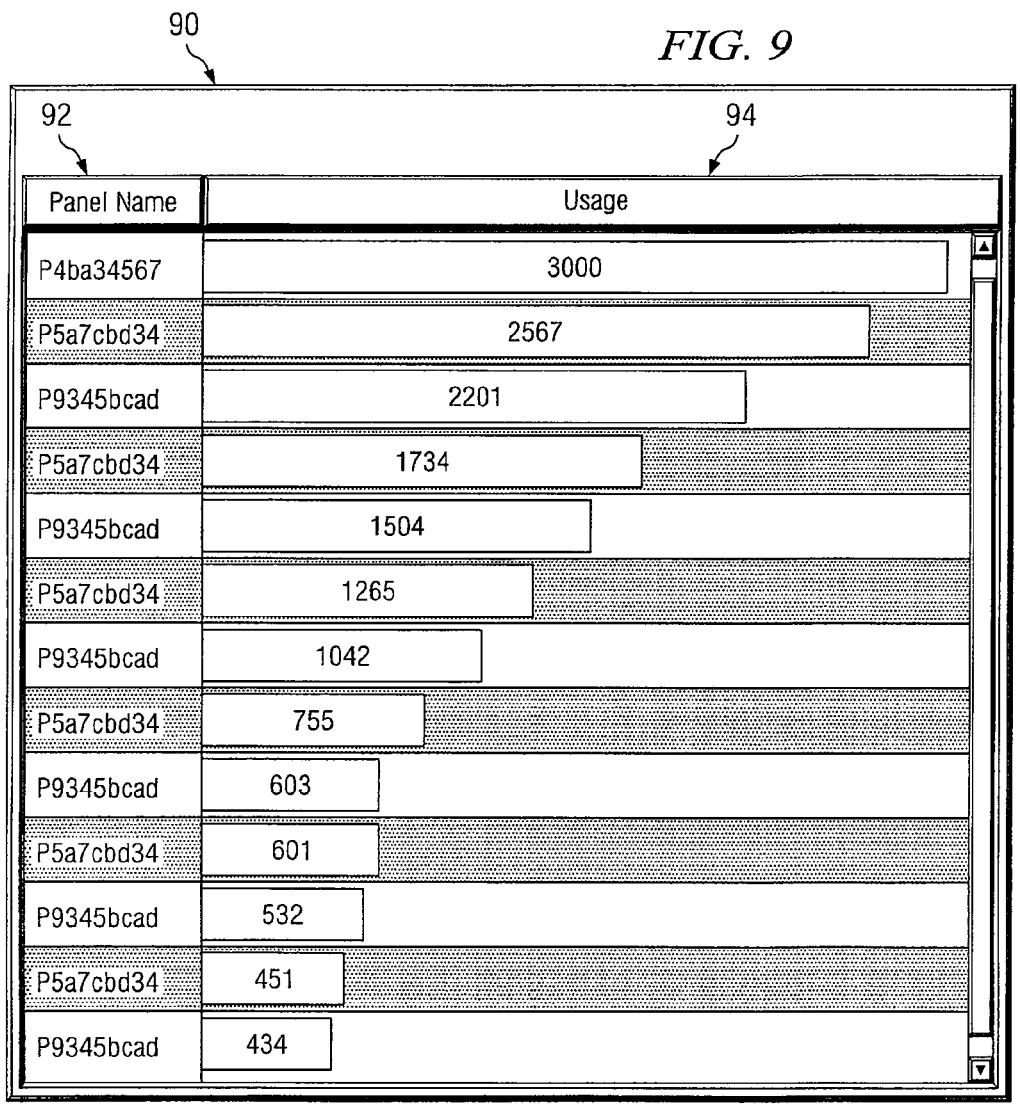
FIG. 9 illustrates an example Panel Usage Overview display according to certain embodiments of the present invention.

FIG. 9 illustrates an example Panel Usage Overview display 90 according to certain embodiments of the present invention. Display 90 may include a simple view comprising a two-column list, a first column 92 including the panel name and a second column 94 including a bar graph of the use of the screen identified in column 92 over a selected time period with the actual use count shown in association with the rendered bar. In certain embodiments, double-clicking a panel name in this view launches a new display that shows additional details regarding the selected panel. As shown in the FIG. 9, the Panel Name may be the state identification, and the use is the collected statistic identifying the number of observations of the panel in one or more interaction sessions, given certain filtering parameters. In certain embodiments, Panel Usage Overview display 90 may be displayed with a statistical finite state machine graph such as the one illustrated above with reference to FIG. 5.

As a second example display, reporting module 56 may provide a "Panel Transition Flow" display. This display may include a tab within the panel editor that shows some or all of the screens that can be used to enter a particular screen, as well as some or all of the screens that can be entered from the selected screen.

Figure 10:
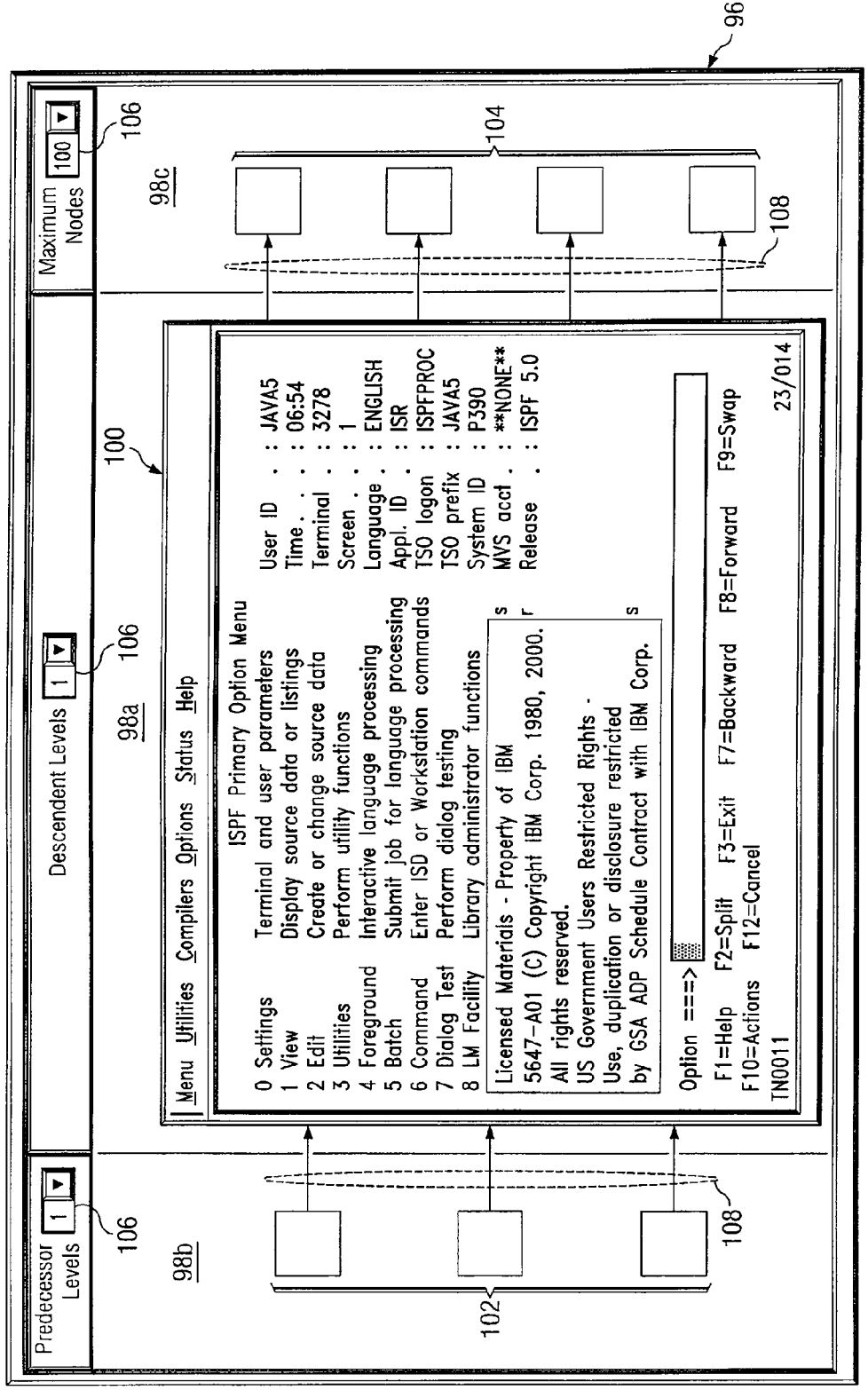
FIG. 10 illustrates an example Panel Transition Flow display according to certain embodiments of the present invention.

FIG. 10 illustrates an example Panel Transition Flow display 96 according to certain embodiments of the present invention. A first portion 98(a) of display 96 shows a selected screen 100. A second portion 98b of display 96 shows one or more of the screens 102 that can be used to enter screen 100. A third portion 98c of panel 96 shows one or more of the screens 104 that can be entered from screen 100. The number of levels backwards and forwards from screen 100 may be configured using tools 106, along with the maximum number of screens shown in the display. If the number of screens found according to the parameters specified using tools 106 exceeds the specified maximum number, the screens with the lowest use counts may not be displayed in display 96. An indicator may be displayed indicating that screens have been omitted. A user may cause the omitted screens to be displayed by decreasing the number of levels displayed or increasing the maximum number of screens placed in the display.

In certain embodiments, double-clicking a screen (e.g., one of screens 102 or 104) in this view re-centers the display on the selected screen (e.g., replace screen 100 with the selected screen). In certain embodiments, double-clicking a transition arrow 108 causes the editor to display the Transition Detail display (described more fully below) for the transition associated with the selected transition arrow. Display 96 may facilitate navigation of the statistical finite state machine describing legacy host system 12 (or application 18 of legacy host system 12) by visually showing the states (screens) and connected states.

As a third example display, reporting module 56 may provide a "Panel View" display, which may include a tab within the panel editor that shows the screen, the invariant text of the screen, and one or more defined rules. The Panel View display may allow a user to view the fields that have been selected as important, along with the derived data types of those fields.

As a fourth example display, reporting module 56 may provide a "Transition Detail" display, which may include a tab within the panel editor that shows generic entry and response screens.

Figure 11A:
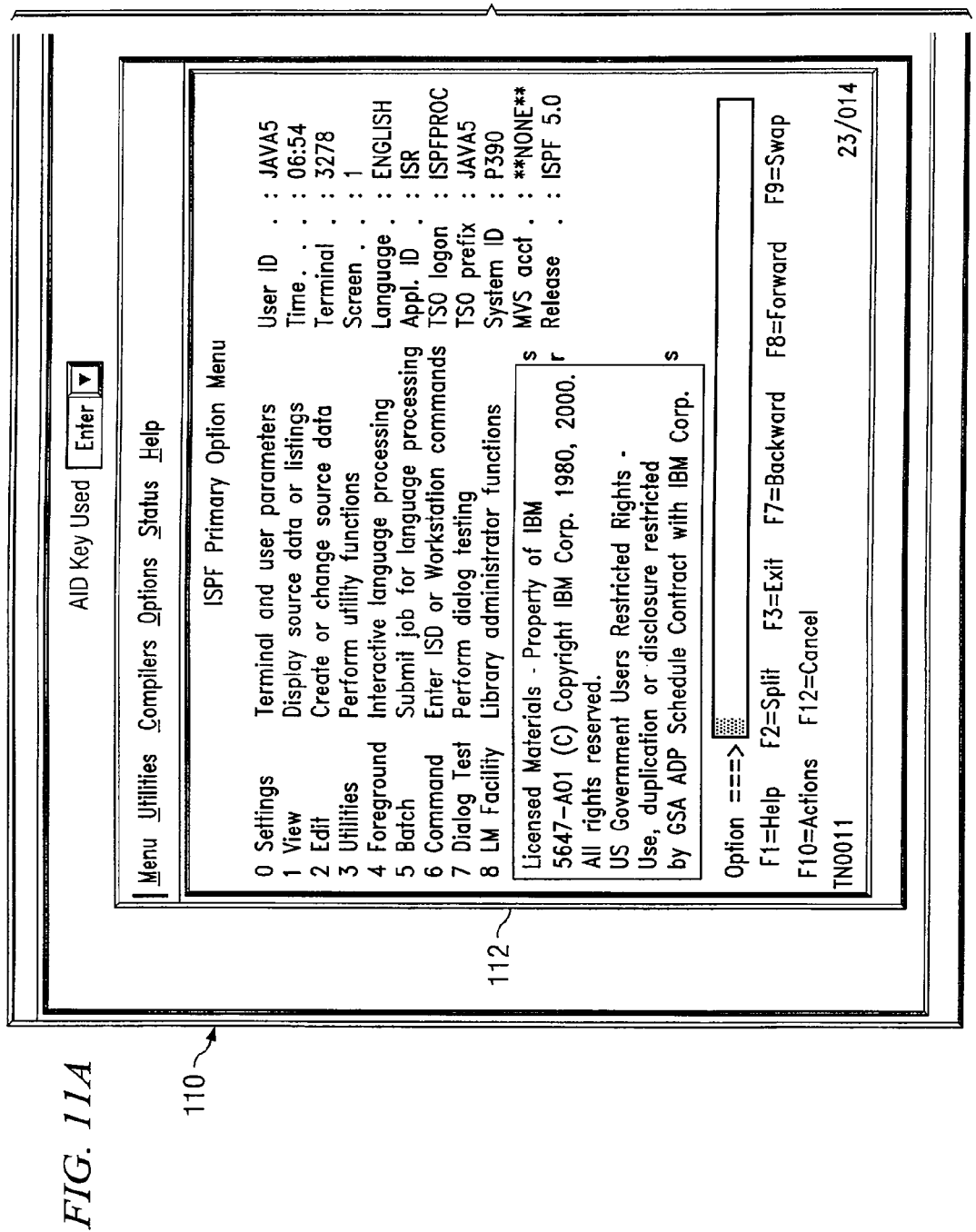
FIGS. 11A-11B illustrate an example Transition Detail display according to certain embodiments of the present invention.
Figure 11B:
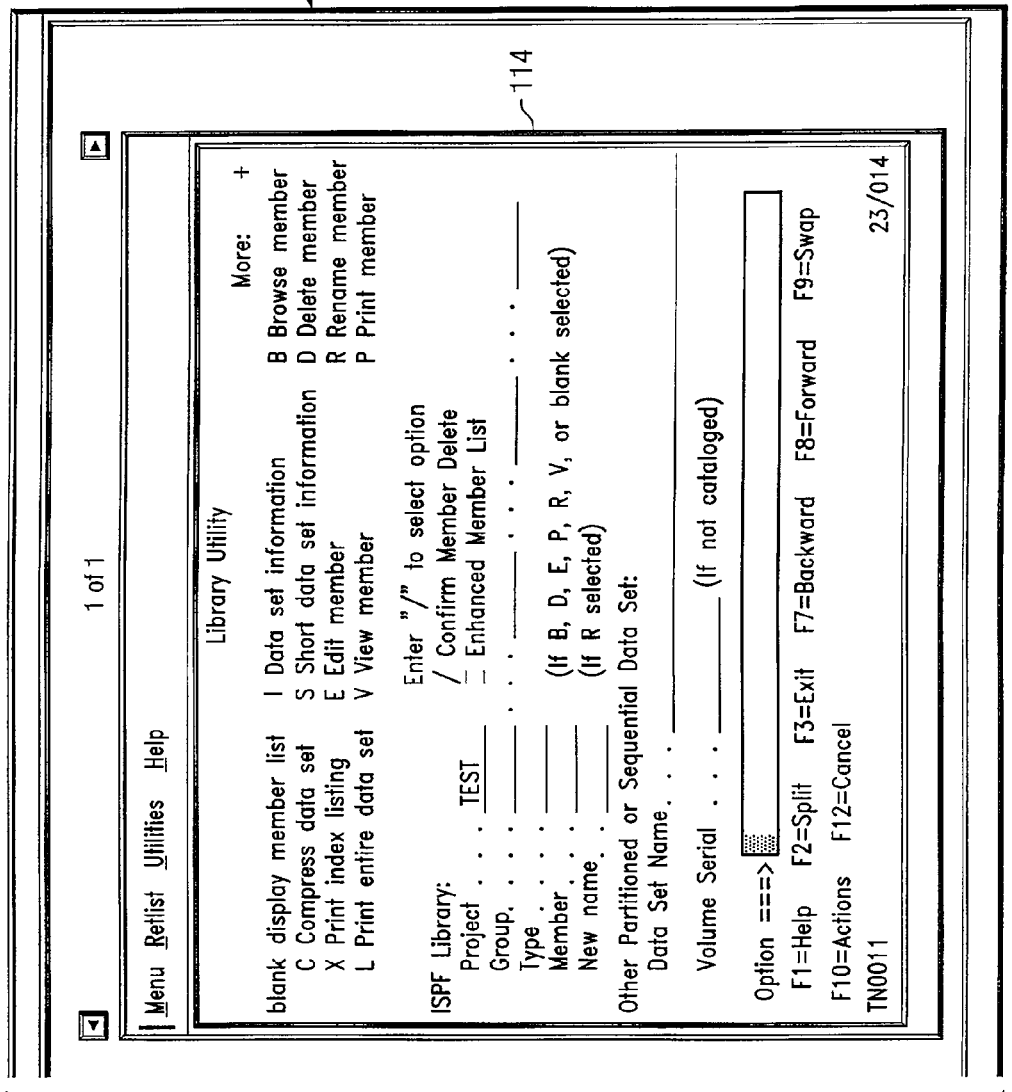

FIGS. 11A-11B illustrate an example Transition Detail display 110 according to certain embodiments of the present invention. In certain embodiments, a user may select a transition 108 on display 96 (as shown above with reference to FIG. 10), and a display similar to display 110 may be displayed. Display 110 includes a generic entry screen 112 and a generic response screen 114. For each detected AID key (e.g., "Enter," in FIG. 11A), display 110 shows what fields were modified when the AID key was entered. For each AID key, multiple sets of entry fields may exist and may be selectable. When a specific set of entry fields and AID keys are selected, a button may be used to enter the Session Flow Detail display, described below.

As a fifth example display, reporting module 56 may provide a "Session Flow Detail" display, which may allow examples of a transition to be selected and displayed to view the audit trail of individual interaction sessions or to illustrate one or more data conditions for making a particular transaction.

Figure 12B:
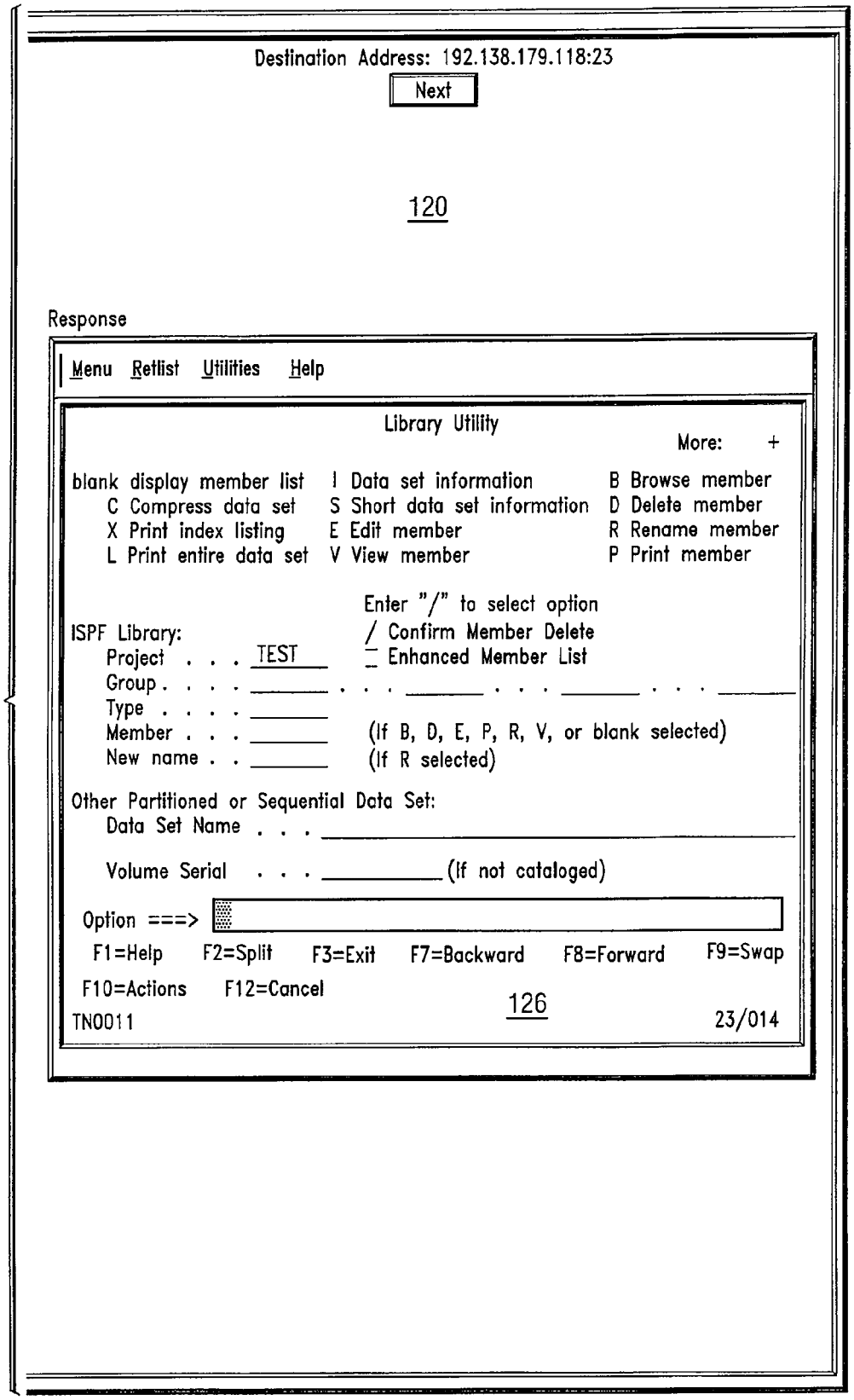

FIGS. 12A-12B illustrate an example Session Flow Detail display 120 according to certain embodiments of the present invention. Display 120 includes three panel views. A first screen view 122 includes the original screen sent by legacy host system 12 to an agent system 16. A second screen view 124 may include the data on that original screen as it was modified by an agent system 16 and sent to legacy host system 12. A third screen view 126 may include the response screen sent by legacy host system 12 in response to screen 124 (which included the modifications to screen 122). Since multiple sessions (e.g., agent interaction sessions with legacy host system 12) may have included the same modifications to the same screen (e.g., the same modifications to screen 122 shown in screen 124), a user may be able to select from a list of interaction sessions with matching transitions. Once an interaction session has been selected, the user may be able to move forward and backward through the selected interaction session to view some or all of the transitions performed by the user whose interaction session is being displayed. In certain embodiments, entering a data encryption key allows display 120 to show actual user data that was collected during the selected interaction session.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for modeling interactions with a computer system, comprising:
for each of a plurality of interaction sessions with a computer system, each interaction session being associated with a corresponding agent system and comprising one or more states, one or more state transitions, and one or more screens encountered during the interaction session:
collecting interaction information for the interaction session, the interaction information comprising data for the one or more states and the one or more state transitions of the interaction session and screen interaction information, the screen interaction information being associated with the one or more screens encountered during the interaction session;
for each screen encountered during the interaction session:
determining whether a stored instance of the screen already exists, the stored instance of the screen comprising a stored screen object for the screen previously generated for a previous encounter with a screen matching this screen;
if a stored instance of the screen exists, retrieving the stored instance of the screen; and
if a stored instance of the screen does not exist:
generating a unique identifier for the screen; and
storing an instance of the screen indexed by the unique identifier for the screen, the stored instance for the screen comprising a screen object of the screen;
identifying the one or more states encountered during the interaction session based on the collected interaction information, including based on the one or more screens encountered during the interaction session; and
generating, based on the one or more states encountered during the interaction session, a trace of the interaction session; and
generating, based on the traces of the plurality of interaction sessions, a model of the plurality of interaction sessions, the model comprising the traces for each of the plurality of interaction sessions.

2. The method of claim 1, wherein:
each interaction session comprises one or more actions initiated during the interaction session, each state of the interaction session comprising a screen encountered during the interaction session.

3. The method of claim 1, wherein the screen interaction information comprises data for one or more of the following:
one or more screens encountered during the interaction session;
data input into a screen using an agent system;
data output into a screen from the computer system; and
one or more action keys engaged during the interaction session.

4. The method of claim 1, wherein determining whether a stored instance of the screen exists comprises:
determining a unique identifier for the screen;
accessing an index of unique identifiers each associated with a corresponding screen; and
determining whether the unique identifier of the screen matches a unique identifier of a stored instance of a screen to determine whether a stored instance of the screen exists.

5. The method of claim 4, wherein the determined unique identifier comprises a hash code generated by applying a hashing algorithm to interaction information associated with the screen.

6. The method of claim 1, wherein the trace of an interaction session reflects each state encountered during the interaction session and any actions requested during the interaction session.

7. The method of claim 1, wherein the model comprises a statistical finite state machine graph of the plurality of interaction sessions, the statistical finite state machine graph comprising at least a portion of the traces for the interaction sessions.

8. The method of claim 1, wherein the model further comprises one or more usage statistics for one or more nodes of the statistical finite state machine graph.

9. The method of claim 7, further comprising displaying at least a portion of the statistical finite state machine graph.

10. The method of claim 1, wherein the computer system comprises a mainframe computer system.

11. The method of claim 1, wherein interaction information is collected using a terminal emulation protocol, the terminal emulation protocol comprising one or more of the following:

TN3270;
TN5250 NVT; and
VT220.

12. A system for modeling interactions with a computer system, comprising:
- a memory module operable to store, for each of a plurality of interaction sessions with a computer system, each interaction session being associated with a corresponding agent system and comprising one or more states, one or more state transitions, and one or more screens encountered during the interaction session, interaction information for the interaction session, the interaction information comprising data for the one or more states and the one or more state transitions of the interaction session and screen interaction information, the screen interaction information being associated with the one or more screens encountered during the interaction session;
- one or more processing units operable to:
  - for each of the plurality of interaction sessions:
    - for each screen encountered during the interaction session:
      - determine whether a stored instance of the screen already exists, the stored instance of the screen comprising a stored screen object for the screen previously generated for a previous encounter with a screen matching this screen;
      - if a stored instance of the screen exists, retrieve the stored instance of the screen; and
      - if a stored instance of the screen does not exist:
        - generate a unique identifier for the screen; and
        - store an instance of the screen indexed by the unique identifier for the screen, the stored instance for the screen comprising a screen object of the screen;
    - identify the one or more states encountered during the interaction session based on the collected interaction information, including based on the one or more screens encountered during the interaction session; and
    - generate, based on the one or more states encountered during the interaction session, a trace of the interaction session; and
  - generate, based on the traces of the plurality of interaction sessions, a model of the plurality of interaction sessions, the model comprising the traces for each of the plurality of interaction sessions.

13. The system of claim 12, wherein:
each interaction session comprises one or more actions initiated during the interaction session, each state of the interaction session comprising a screen encountered during the interaction session.

14. The system of claim 12, wherein the screen interaction information comprises data for one or more of the following:
one or more screens encountered during the interaction session;
data input into a screen an agent system;
data output into a screen from the computer system; and
one or more action keys engaged during the interaction session.

15. The system of claim 12, wherein the one or more processing units are operable to determine whether a stored instance of the screen exists by:
determining a unique identifier for the screen;
accessing an index of unique identifiers each associated with a corresponding screen; and
determining whether the unique identifier of the screen matches a unique identifier of a stored instance of a screen to determine whether a stored instance of the screen exists.

16. The system of claim 15, wherein the determined unique identifier comprises a hash code generated by applying a hashing algorithm to interaction information associated with the screen.

17. The system of claim 12, wherein the trace of an interaction session reflects each state encountered during the interaction session and any actions requested during the interaction session.

18. The system of claim 12, wherein the model comprises a statistical finite state machine graph of the plurality of interaction sessions, the statistical finite state machine graph comprising at least a portion of the traces for the interaction sessions.

19. The system of claim 12, wherein the model further comprises one or more usage statistics for one or more nodes of the statistical finite state machine graph.

20. The system of claim 19, wherein the one or more processing units are further operable to display at least a portion of the statistical finite state machine graph.

21. The system of claim 12, wherein the computer system comprises a mainframe computer system.

22. The system of claim 12, wherein interaction information is collected using a terminal emulation protocol, the terminal emulation protocol comprising one or more of the following:
TN3270;
TN5250 NVT; and
VT220.

23. Software for modeling interactions with a computer system, the software being embodied in a computer-readable storage medium and when executed operable to:
for each of a plurality of interaction sessions with a computer system, each interaction session being associated with a corresponding agent system and comprising one or more states, one or more state transitions, and one or more screens encountered during the interaction session:
collect interaction information for the interaction session, the interaction information comprising data for the one or more states and the one or more state transitions of the interaction session and screen interaction information, the screen interaction information being associated with the one or more screens encountered during the interaction session;
for each screen encountered during the interaction session:
determine whether a stored instance of the screen already exists, the stored instance of the screen comprising a stored screen object for the screen previously generated for a previous encounter with a screen matching this screen;
if a stored instance of the screen exists, retrieve the stored instance of the screen; and
if a stored instance of the screen does not exist:
generate a unique identifier for the screen; and
store an instance of the screen indexed by the unique identifier for the screen, the stored instance for the screen comprising a screen object of the screen;
identify the one or more states encountered during the interaction session based on the collected interaction information, including based on the one or more screens encountered during the interaction session; and generate, based on the one or more states encountered during the interaction session, a trace of the interaction session; and generate, based on the traces of the plurality of interaction sessions, a model of the plurality of interaction sessions, the model comprising the traces for each of the plurality of interaction sessions.

* * * * *